(12) United States Patent
Nakamura et al.

(10) Patent No.: US 8,404,611 B2
(45) Date of Patent: Mar. 26, 2013

(54) EXHAUST GAS PURIFYING CATALYST AND PRODUCTION METHOD THEREOF

(75) Inventors: Masanori Nakamura, Yokosuka (JP); Katsuo Suga, Yokohama (JP); Hironori Wakamatsu, Yokohama (JP); Kazuyuki Shiratori, Yokohama (JP); Hirofumi Yasuda, Yokosuka (JP); Makoto Aoyama, Yokohama (JP); Jun Ikezawa, Yokosuka (JP)

(73) Assignees: Nissan Motor Co., Ltd., Kanagawa-Ken (JP); Renault S.A.S., Boulogne-Billancourt (FR)

( * ) Notice: Subject to any disclaimer, the term of this patent is extended or adjusted under 35 U.S.C. 154(b) by 482 days.

(21) Appl. No.: 12/084,382

(22) PCT Filed: Oct. 31, 2006

(86) PCT No.: PCT/JP2006/321696
§ 371 (c)(1),
(2), (4) Date: Apr. 30, 2008

(87) PCT Pub. No.: WO2007/052627
PCT Pub. Date: May 10, 2007

(65) Prior Publication Data
US 2009/0111688 A1    Apr. 30, 2009

(30) Foreign Application Priority Data

Nov. 1, 2005 (JP) ................................. 2005-318370
Feb. 22, 2006 (JP) ................................. 2006-045790

(51) Int. Cl.
*B01J 23/00*    (2006.01)
*B01J 31/00*    (2006.01)
*B01J 23/32*    (2006.01)

(52) U.S. Cl. ........ 502/102; 502/303; 502/325; 502/304; 502/326; 502/324

(58) Field of Classification Search .................... None
See application file for complete search history.

(56) References Cited

U.S. PATENT DOCUMENTS
(Continued)

FOREIGN PATENT DOCUMENTS

EP    1 522 341 A1    4/2005
JP    08-131830 A    5/1996
(Continued)

OTHER PUBLICATIONS

Korean Office Action issued Nov. 30, 2009.
(Continued)

*Primary Examiner* — Melvin C Mayes
*Assistant Examiner* — Sheng H Davis
(74) *Attorney, Agent, or Firm* — Foley & Lardner LLP

(57) ABSTRACT

An object is to maintain an effect of enhancing activity of noble metal particles by transition metal without increasing production cost and an environmental load. An exhaust gas purifying catalyst 1 is composed of: noble metal particles 2; first compounds 3 which contact the noble metal particles 2 and suppress movement of the noble metal particles 2; and second compounds 4 which contain the noble metal particles 2 and the first compounds 3, suppress the movement of the noble metal particles 2, and suppress coagulation of the first compounds 3 following mutual contact of the first compounds 3, wherein the first compounds 3 support the noble metal particles 2, and simplexes or aggregates of the first compounds 3 supporting the noble metal particles 2 are included in section partitioned by the second compounds 4.

33 Claims, 6 Drawing Sheets

U.S. PATENT DOCUMENTS

| | | |
|---|---|---|
| 2004/0234439 A1* | 11/2004 | Takeshima et al. ............ 423/263 |
| 2005/0234137 A1* | 10/2005 | Espinoza et al. .............. 518/716 |
| 2006/0108262 A1* | 5/2006 | Takatsu et al. ................. 208/189 |
| 2007/0155625 A1 | 7/2007 | Yasuda et al. |
| 2007/0167319 A1* | 7/2007 | Shiratori et al. .............. 502/304 |
| 2009/0111688 A1 | 4/2009 | Nakamura et al. |

FOREIGN PATENT DOCUMENTS

| | | |
|---|---|---|
| JP | 2000-015097 A | 1/2000 |
| JP | 2003-117393 A | 4/2003 |
| JP | 2005-000829 A | 1/2005 |
| JP | 2005-000830 A | 1/2005 |
| JP | 2005-111336 A | 4/2005 |
| JP | 2005-185968 A | 7/2005 |
| JP | 2005-185969 A | 7/2005 |
| WO | WO 00/27527 | 5/2000 |
| WO | WO 2005/063384 A1 | 7/2005 |
| WO | WO 2005/063391 A1 | 7/2005 |
| WO | WO 2005063390 * | 7/2005 |
| WO | WO 2007/052627 | 5/2007 |

OTHER PUBLICATIONS

Supplementary Partial European Search Report Application No. EP 06 82 2625 dated Sep. 19, 2012.

Notification of Reasons for Refusal Japanese Application No. 2009-190530 dated Sep. 25, 2012.

Notification of Reasons for Refusal Japanese Patent Application No. 2010-053001 dated Jan. 8, 2013.

* cited by examiner (a)

(b)

EXHAUST GAS PURIFYING CATALYST AND PRODUCTION METHOD THEREOF

TECHNICAL FIELD

The present invention relates to an exhaust gas purifying catalyst suitable for application to treatment for purifying exhaust gas discharged from an internal combustion engine, and relates to a production method of the exhaust gas purifying catalyst.

BACKGROUND ART

In recent years, in order to remove harmful substances such as a hydrocarbon (HC) compound, carbon monoxide (CO) and carbon nitride ($No_x$), which are contained in exhaust gas exhausting from an internal combustion engine, an exhaust gas purifying catalyst in which particles of noble metal such as platinum (Pt) are supported on a support of a metal oxide such as alumina ($Al_2O_3$) has been being widely used. In the conventional exhaust gas purifying catalyst, a large amount of such noble metal particles are used in order to enhance durability of the noble metal particles against variations of an ambient atmosphere. However, it is not desirable to use the large amount of noble metal particles from a viewpoint of protecting the earth's resources.

From such a background, an attempt has been recently made to enhance the durability of the noble metal particles in such a manner that transition metal such as cerium (Ce) and manganese (Mn), or a transition metal compound, which functions as an oxygen storage component (OSC) material, is disposed in the vicinity of the noble metal particles by an impregnation method, whereby the variations of such an atmosphere around the noble metal particles is suppressed by the transition metal or the transition metal compound (refer to Patent Documents 1 to 4). Note that, in accordance with the method as described above, enhancement of activity of the noble metal particles can also be expected in addition to the enhancement of the durability of the noble metal particles.

Patent Document 1: Japanese Patent Laid-Open Publication No. H8-131830
Patent Document 2: Japanese Patent Laid-Open Publication No. 2005-000829
Patent Document 3: Japanese Patent Laid-Open Publication No. 2005-000830
Patent Document 4: Japanese Patent Laid-Open Publication No. 2003-117393

DISCLOSURE OF THE INVENTION

In the case of suppressing the variations of the atmosphere around the noble metal particles by such compounds of the transition metal, it is necessary that both of the noble metal particles and particles of the compounds of the transition metal be microparticles and contact each other. However, in the case of using the impregnation method, the noble metal particles and such compound particles of the transition metal do not become the microparticles even if both thereof can be brought into contact with each other, or both cannot be brought into contact with each other or can be brought into little contact with each other even if both become the microparticles, and accordingly, it is difficult to arrange the compound particles of the transition metal in the vicinity of the noble metal particles as designed. Moreover, in the case of attempting the enhancement of the durability of the noble metal particles, it is desirable to set an average particle diameter of the noble metal particles at 2 [nm] or more, and in the case of attempting the enhancement of the activity of the noble metal particles, it is desirable to set the average particle diameter of the noble metal particles at 5 [nm] or less. However, in the case of using the impregnation method, the average particle diameter of the noble metal particles becomes 1.5 [nm] or less, and it is difficult to expect the enhancement of the durability of the noble metal particles and the enhancement of the activity thereof.

Moreover, the compounds of the transition metal are prone to be solid-solved with the alumina widely used as such a metal oxide support. Accordingly, it is difficult to obtain an effect of enhancing the activity of the noble metal particles only by arranging the compounds of the transition metal in the vicinity of the noble metal particles. Note that, in order to solve such a problem, a method of supporting the compounds of the transition metal on a support that is not solid-solved with the compounds of the transition metal concerned is considered. However, in the case of using this method, the compounds of the transition metal move in a high-temperature atmosphere, and the compounds of the transition metal contact one another, whereby the compounds of the transition metal are coagulated. Moreover, in order to prevent such coagulation of the compounds of the transition metal, a method of producing compound particles of the transition metal, which have a large surface area, by using a reversed micelle method is considered. However, an organic solvent is used in this method, and accordingly, production cost and an environmental load are increased.

In order to solve the above-described problems, an exhaust gas purifying catalyst according to the present invention is summarized to include: noble metal particles; first compounds which contact the noble metal particles and suppress movement of the noble metal particles; and second compounds which contain the noble metal particles and the first compounds, suppress the movement of the noble metal particles, and suppress coagulation of the first compounds following mutual contact of the first compounds, wherein the first compounds support the noble metal particles, and simplexes or aggregates of the first compounds supporting the noble metal particles are included in sections partitioned by the second compounds.

In accordance with the exhaust gas purifying catalyst according to the present invention, the noble metal particles are covered with the first compounds, whereby the mutual coagulation of the first compounds is also suppressed as well as the movement of the noble metal particles. Accordingly, the effect of enhancing the activity of the noble metal particles by the first compounds can be maintained without increasing the production cost and the environmental load.

Moreover, a production method of an exhaust gas purifying catalyst according to the present invention is summarized to include: a first step of preparing a composite colloidal solution in which noble metal particles contact first compounds; and a second step of forming second compounds on peripheries of the first compounds in the colloidal solution, which are brought into contact with the noble metal particles.

In accordance with the production method of an exhaust gas purifying catalyst according to the present invention, the exhaust gas purifying catalyst according to the present invention can be produced with ease.

BEST MODE FOR CARRYING OUT THE INVENTION

A description will be made below of embodiments of an exhaust gas purifying catalyst of the present invention while using the drawings.

Figure 1:
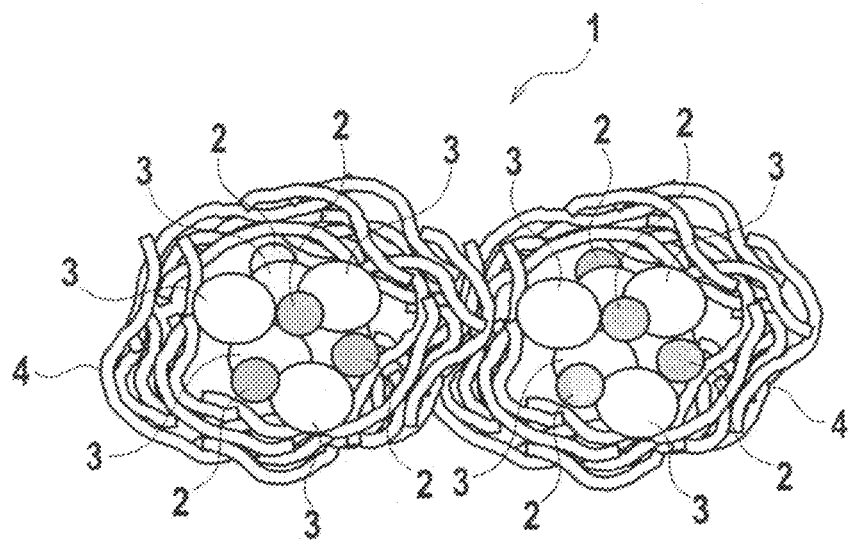
FIG. 1 is a schematic view showing a configuration of an exhaust gas purifying catalyst serving as an embodiment of the present invention.

FIG. 1 is a schematic view of an exhaust gas purifying catalyst serving as an embodiment of the present invention. The exhaust gas purifying catalyst 1 shown in this drawing is composed of: noble metal particles 2 having catalytic activity; first compounds 3 which contact the noble metal particles 2 and suppress movement of the noble metal particles 2 concerned; and second compounds 4 which contain the noble metal particles 2 and the first compounds 3, suppress the movement of the noble metal particles 2 concerned, and suppress coagulation of the first compounds 3 following mutual contact of the first compounds 3. The first compounds 3 support the noble metal particles 2. Moreover, aggregates of the plurality of first compounds 3 which support the noble metal particles 2 are included in sections partitioned by the second compounds 4.

As a result of assiduously carrying on the research over and over again, the inventors of the invention of this application found out that compounds of transition metal are chemically bonded to the noble metal particles, whereby the movement of the noble metal particles can be chemically suppressed, and that the noble metal particles are covered with the compounds, whereby the movement of the noble metal particles can be physically suppressed. Moreover, the inventors found out that both of the noble metal particles and the compounds of the transition metal are covered with compounds, whereby coagulation of the compounds of the transition metal can also be suppressed as well as the movement of the noble metal particles can be suppressed.

In the exhaust gas purifying catalyst 1 shown in FIG. 1, which is composed based on such findings, the noble metal particles 2 and the first compounds 3 contact each other, and the noble metal particles 2 are supported on the first compounds 3, whereby the first compounds 3 act as an anchor agent of the chemical bonding, and suppress the movement of the noble metal particles. Moreover, a form is made, in which the noble metal particles 2 are covered with and contained in the first compounds 3 and the second compounds 4, whereby the movement of the noble metal particles 2 is physically suppressed. Furthermore, the noble metal particles 2 and the first compounds 3 are contained in sections partitioned by the second compounds 4, whereby the first compounds 3 are suppressed from contacting one another and being coagulated beyond the sections partitioned by the second compounds 4. From these facts, without increasing production cost and an environmental load, the exhaust gas purifying catalyst 1 can prevent a decrease of the catalytic activity, which may be caused by the coagulation of the noble metal particles 2, and moreover, can maintain an effect of enhancing the activity of the noble metal particles 2 by the first compounds 3.

Figure 2:
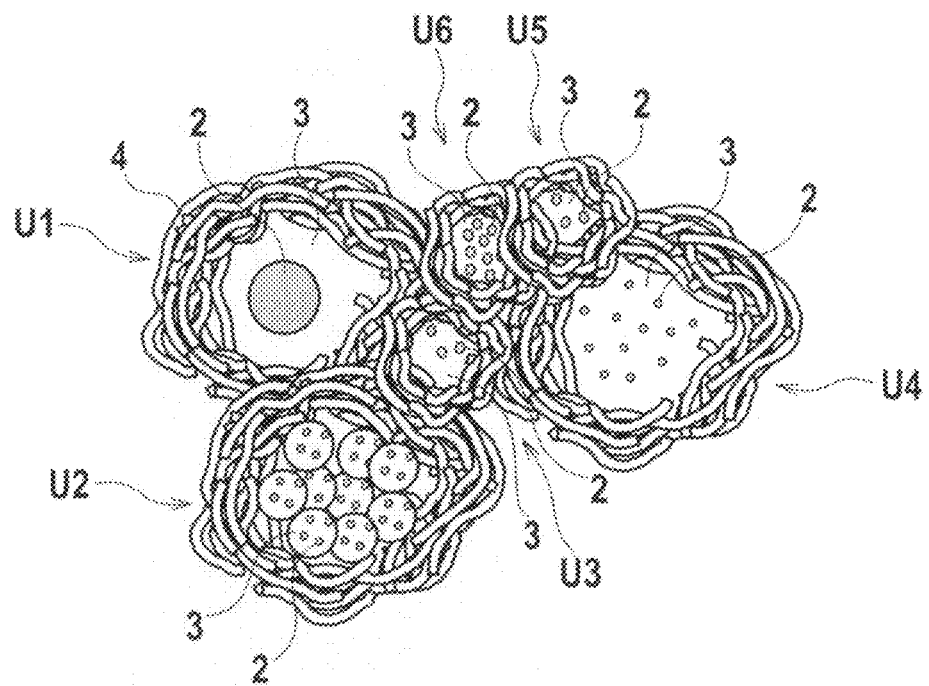
FIG. 2 is a schematic view showing a configuration of an exhaust gas purifying catalyst serving as another embodiment of the present invention.

FIG. 2 is a schematic view of an exhaust gas purifying catalyst serving as another embodiment of the present invention. The exhaust gas purifying catalyst 1 shown in this drawing is the same as the exhaust gas purifying catalyst 1 shown in FIG. 1 in that it is composed of: the noble metal particles 2; the first compounds 3 which support the noble metal particles 2; and the second compounds 4 which contain the noble metal particles 2 and the first compounds 3. Then, in the sections partitioned by the second compounds 4, the noble metal particles 2 and the first compounds 3 are included in a variety of modes.

In FIG. 2, among the plurality of sections partitioned by the second compounds 4, in a unit U1, the simplex first compound 3 that supports the simplex noble metal particle 2 is included. Moreover, in a unit U2, the plural pieces of first compounds 3 which support the plurality of noble metal particles 2 are included in a form of a coagulated aggregate (secondary particle). Furthermore, in units U3 to U6, the simplex first compound 3 that supports the plurality of noble metal particles 2 is included while varying a particle diameter.

In a similar way to the exhaust gas purifying catalyst 1 shown in FIG. 1, also in the exhaust gas purifying catalyst of this embodiment, which is shown in FIG. 2, the first compounds 3 are suppressed from contacting one another and being coagulated beyond the sections partitioned by the second compounds 4. Hence, the exhaust gas purifying catalyst of this embodiment has a similar effect to that of the exhaust gas purifying catalyst 1 shown in FIG. 1.

Figure 3:
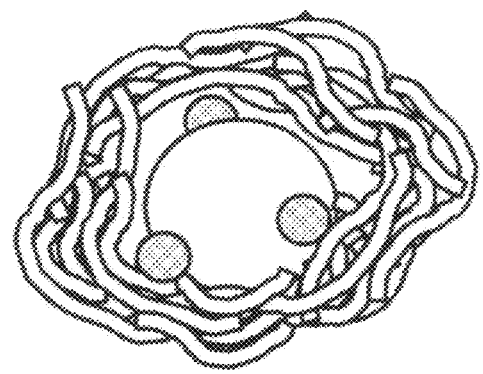
FIG. 3 is schematic view showing examples of before and after coagulation of a noble metal particle 2 in one unit.
Figure 3:
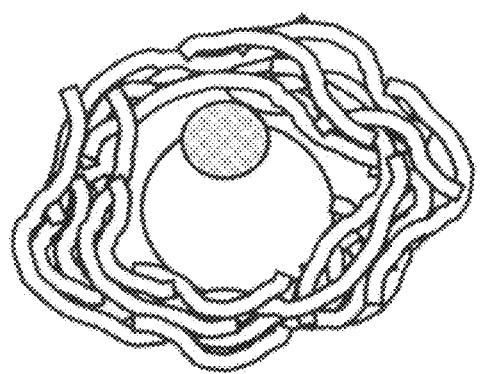

It is preferable that the noble metal particles be contained by an amount of $8\times10^{-20}$ mol or less in total in the sections partitioned by the second compounds 4. As shown in FIG. 2, there are a variety of modes in the noble metal particles 2 and the first compounds 3, which are included in the sections partitioned by the second compounds 4. In these sections, the plural pieces of noble metal particles 2 sometimes move and are coagulated with one another. In this case, in any of the units U1 to U6, the noble metal particles 2 do not move to the second compounds 4 owing to the effect of the first compounds 3 as the anchor agent, and are coagulated into one or plural pieces of noble metal particles only in each of the units. An example of before and after the coagulation of the noble metal particles 2 in one unit is schematically shown in FIG. 3.

Figure 4:
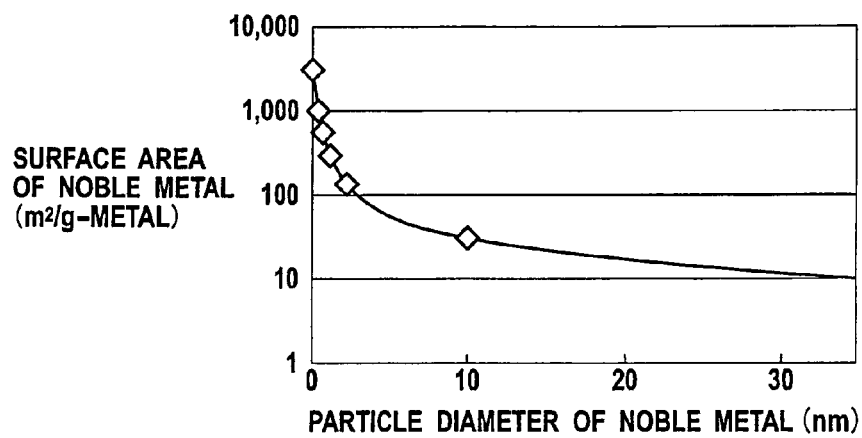
FIG. 4 is a graph showing a relationship between a noble metal particle diameter and a noble metal particle surface area.

Here, in the case where the noble metal particles are coagulated in one unit, if the particle diameter of the coagulated noble metal particles is 10 [nm] or less, then the noble metal particles exhibit sufficient catalytic activity, thus making it possible to suppress a deterioration of the catalytic activity, which may be caused by the coagulation thereof. FIG. 4 is a graph showing a relationship between the noble metal particle diameter and a noble metal surface area for each of platinum and palladium, which are the noble metals having the catalytic activity. Note that, in this graph, the relationships for both of the platinum and the palladium are shown as one curve since substantially the same curve is drawn in both of the cases where the noble metal is the platinum and the palladium. As apparent from this graph, if the particle diameter of the noble metals is 10 [nm] or less, then the particle surface area is large, and the sufficient activity can be obtained, and accordingly, the deterioration of the catalytic activity owing to the coagulation can be suppressed.

Figure 5:
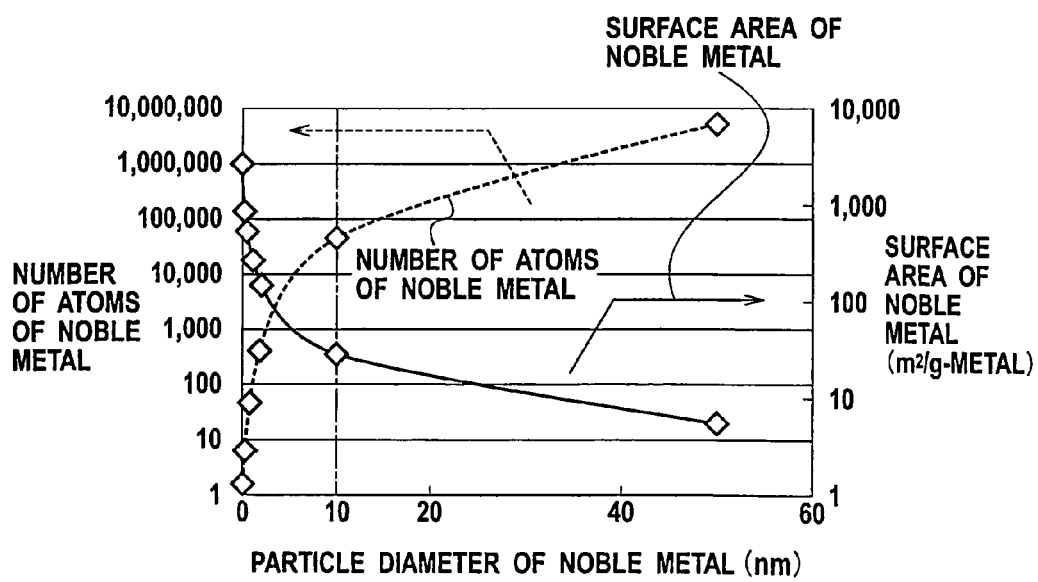
FIG. 5 is a graph showing a relationship between the noble metal particle diameter and a number of atoms of noble metal.

FIG. 5 is a graph showing a relationship between the noble metal particle diameter and the number of atoms of the noble metal for each of the platinum and the palladium, which are the noble metals having the catalytic activity. Note that, in this graph, the relationships for both of the platinum and the palladium are shown as one curve since substantially the same curve is drawn in both of the cases where the noble metal is the platinum and the palladium. As apparent from this graph, the number of atoms when the particle diameter of the noble metals is 10 [nm] is approximately 48000, and when this value is converted into the number of moles, the number of moles quantitatively becomes approximately $8 \times 10^{-20}$ or less.

From these viewpoints, in any mode of the units U1 to U6, the amount of noble metal in the unit is limited to set at $8 \times 10^{-20}$ or less, whereby the deterioration of the catalytic activity can be suppressed even if the noble metal particles are coagulated into one.

As means for reducing the amount of noble metal included in the unit to $8 \times 10^{20}$ or less, two means are present, which are: to decrease a supported concentration of the noble metal particles 2 on the first compounds 3; and to reduce a particle diameter of the first compounds 3 which support the noble metal particles 2. In the present invention, the reduction means is not limited to these means; however, in the case of considering the actual production of the catalyst, a capacity of a honeycomb support on which the exhaust gas purifying catalyst is coated must be increased in order to maintain predetermined performance of the exhaust gas purifying catalyst in such a former method of decreasing the supported concentration. Hence, the former method is not realistic since it is necessary to coat the catalyst, of which amount is larger by one digit than a usual amount, on the honeycomb support.

With regard to the particle diameter of the first compounds 3, it is preferable to set a maximum particle diameter at 2 [nm]. The first compounds 3 have a function as the anchor agent that contacts the noble metal particles 2 and suppresses the movement of the noble metal particles 2. The inventors found out that an anchor effect of the anchor agent is affected by a size of the first compounds 3 themselves. Even if the noble metal is simply impregnated into and supported on the powder-like first compounds such as, for example, ceria, and is dispersed into alumina like the conventional exhaust gas purifying catalyst, it is difficult to exert the above-described sufficient effect of suppressing the coagulation of the noble metal. For example, in the case of obtaining the first compounds 3 by a conventional milling method using a ball mill, a particle diameter of 2 to 3 [nm] is only obtained to the minimum. In the case of supporting the noble metal particles 2 on the particles of the first compounds 3 with the diameter as described above, when the noble metal particles 2 are supported on the particles of the first compounds 3 by an amount determined by an upper limit of a coated amount thereof on an actual cordierite honeycomb support and determined by a usage amount of the noble metal, the noble metal particles 2 are coagulated to a size of several ten [nm] by the fact that the exhaust gas purifying catalyst at a high temperature for a long time, whereby the catalytic activity is deteriorated. Hence, at the time of applying the first compounds 3 to the actual catalyst, it is preferable that the maximum particle diameter of the first compounds 3 included in the sections partitioned by the second compounds 4 be 2 [nm] or less.

When the particles of the first compounds 3 are produced by a variety of production methods, the particle diameter of the obtained first compounds 3 has variations, and has a predetermined particle size distribution corresponding to production conditions. Therefore, the particle diameter of the first compounds 3 is sometimes represented by an average particle diameter. In the exhaust gas purifying catalyst according to this embodiment of the present invention, a preferable average particle diameter of the first compounds 3 included in the sections partitioned by the second compounds 4 is 50 [nm] or less. When the average particle diameter of the first compounds 3 exceeds 50 [nm] or less, the amount of the noble metal particles 2 supported on the first compounds as the anchor agent is increased, a distance between the noble metal particles 2 becomes short, and the coagulation of the noble metal particles 2 is accelerated.

Figure 6:
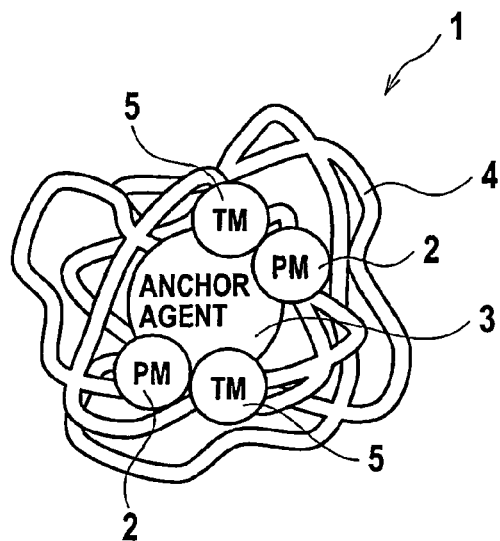
FIG. 6 is a schematic view showing a configuration of an exhaust gas purifying catalyst serving as an embodiment of the present invention.

A more preferable average particle diameter of the first compounds 3 is 30 [nm] or less. FIG. 6 is a schematic view of another embodiment of the exhaust gas purifying catalyst according to the present invention, which includes the simplex first compound 3 in the section partitioned by the second compound 4.

In the embodiment shown in FIG. 6, the exhaust gas purifying catalyst 1 serving as the embodiment of the present invention is composed of: the noble metal particles (PM) 2; the first compound (anchor agent) 3 that contacts the noble metal particles 2 and suppresses the movement of the noble metal particles 2; the second compound 4 that suppresses the coagulation of the first compound (anchor agent) 3 with the others following the contact of the first compound (anchor agent) 3 with the others; and transition metal compounds 5 included as promoter components. The average particle diameter of the first compounds (anchor agent) 3 is adjusted to 30 [nm] or less.

Specifically, the exhaust gas purifying catalyst 1 serving as the embodiment of the present invention, which is shown in FIG. 6, covers the noble metal particles 2 and the first compound (anchor agent) 3 with the second compound 4, thereby suppresses the coagulation of the first compounds (anchor agent) 3 with the others as well as the movement of the noble metal particles 2. Hence, in accordance with the exhaust gas purifying catalyst 1 serving as the embodiment of the present invention, the effect of enhancing the activity of the noble metal particles 2 by the first compound (anchor agent) 3 can be maintained without increasing the production cost and the environmental load.

Moreover, by the fact that the average particle diameter of the first compounds 3 is 30 [nm] or less, the exhaust gas purifying catalyst 1 of this embodiment can further suppress the coagulation of the noble metal particles 2. An optimum range of the average particle diameter of the first compounds 3 is approximately 5 to 15 (nm). A lower limit of the average particle diameter of the first compounds 3 is not particularly limited; however, can be set at 5 [nm] or more as a size at which a crystal structure of the first compounds 3 can be determined by an analytical instrument (for example, XRD).

In the exhaust gas purifying catalyst of the present invention, which is shown in FIG. 1, FIG. 2 or FIG. 6, when adsorption energy of the noble metal particles 2 to the first compounds 3 is Ea, and adsorption stabilization energy of the noble metal particles 2 to the second compounds 4 is Eb, it is preferable that Ea have a value smaller than Eb has (Ea<Eb). The inventors found out that the anchor effect as the function of the first compounds 3 is affected by a difference between such adsorption energies. Specifically, the adsorption energy Ea of the noble metal particles 2 to the first compounds 3 is smaller than the adsorption stabilization energy Eb of the noble metal particles 2 to the second compounds 4, whereby the noble metal particles 2 can be suppressed from moving to the second compounds 4. In such a way, the noble metal particles 3 can be further suppressed from being coagulated.

It is more preferable that the difference (Eb-Ea) between the adsorption energy Ea of the noble metal particles 2 to the first compounds 3 and the adsorption stabilization energy Eb of the noble metal particles 2 to the second compounds 4 exceed 10.0 cal/mol. This difference between the adsorption energies exceeds 10.0 cal/mol, whereby the noble metal particles 2 can be more surely suppressed from moving to the second compounds 4, and the anchor effect as the function of the first compounds 3 is further exerted.

Note that both of the adsorption energy Ea of the noble metal particles 2 to the first compounds 3 and the adsorption stabilization energy Eb of the noble metal particles 2 to the second compounds 3 can be calculated by simulations using a density functional theory. This density functional theory is a method of predicting an electronic state of a crystal by introducing a Hamiltonian that takes in a correlation effect among a large number of electrons. A principle of the density functional theory is based on a mathematical theorem that the entire energy of a ground state of a system can be represented by an electron density functional theory, and as a method of calculating the electronic state of the crystal, the density functional theory has high reliability. In designing a catalyst structure of the present invention, it is difficult to actually measure the difference between the adsorption energies of the noble metal component to the first compounds 3 and the second compounds 4, and a method for predicting a combination in which desired adsorption energies are obtained becomes necessary. Here, the density functional theory is suitable for predicting electronic states on interfaces between the catalyst component and the first compounds 3 and the second compounds 4, which are made of oxides and the like. It is confirmed that the catalyst structure of this embodiment, which is designed based on a combination of the noble metal and the compounds, the combination being selected actually based on simulation values, does not cause oversizing of the noble metal, and maintains high purification performance even after a high-temperature durability test. Analysis software for the simulations using the density functional theory as described above is commercially available, and an example of calculation conditions of the software will be shown below.

Pre/post: Materials studio 3.2 (Accelrys Software Inc.); Solver: DMol3 (Accelrys Software Inc.); temperature: absolute zero; Approximation: GGA approximation.

Figure 7:
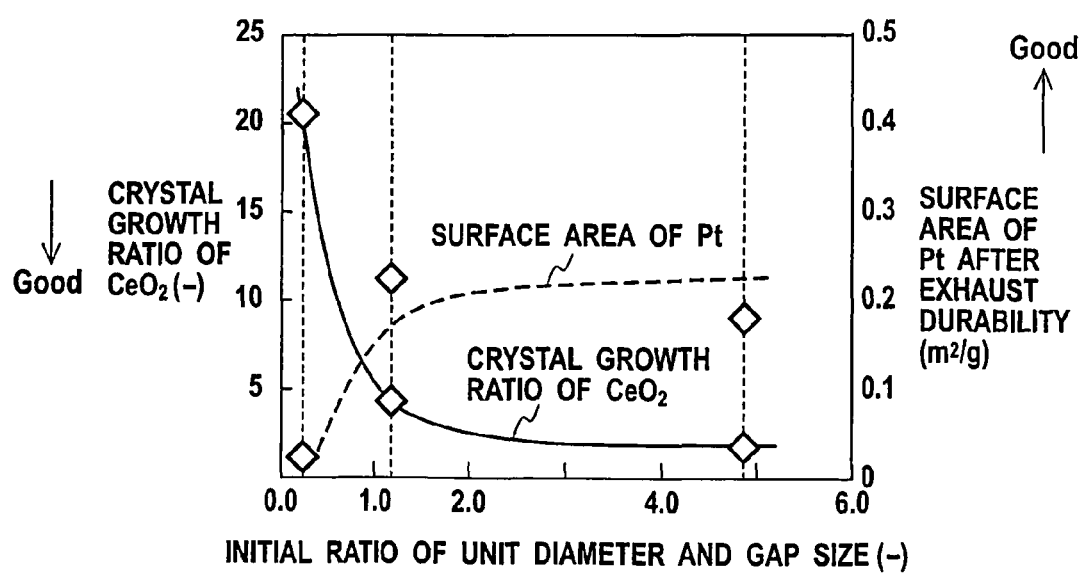
FIG. 7 is graphs showing relationships of a ratio Da/Db of a size Da of composite particles and an average pore diameter Db with respect to a crystal growth ratio of CeO2 and a surface area of Pt.

Next, in composite particles composed of the noble metal particles 2 and the first compounds 3 which support the noble metal particles 2, it is preferable that a size (average particle diameter of the composite particles) Da of the composite particles and an average pore diameter Db of pores formed in the second compounds 4 which contain the composite particles satisfy the following inequality: Db<Da. The inequality: Db<Da means that the average particle diameter Da of units of the composite particles composed of the noble metal particles 2 ad the first compounds 3 is larger than the average diameter Db of gaps formed in the second compounds 4. In other words, it is preferable that a ratio Da/Db of the size Da of the composite particles and the average pore diameter Db be larger than 1 (Da/Db>1). The ratio Da/Db is larger than 1, whereby the composite particles of the noble metal particles 2 and the first compounds 3 are suppressed from moving through the pores formed in the second compounds 4. This effect is confirmed by an experiment of the inventors. FIG. 7 is graphs showing relationships between the ratio Da/Db of the size Da of the composite particles and the average pore diameter Db and a crystal growth ratio of $CeO_2$ as the first compounds 3 and a surface area of Pt as the noble metal particles after an exhaust durability test, in which the ratio Da/Db is represented on an axis of abscissas, and the crystal growth ratio and the surface area are represented on axes of ordinates. From FIG. 7, it is understood that, when Da/Db is 1 or more, the inclusion effect is large since the crystal growth ratio of $CeO_2$ is significantly decreased, that is, since $CeO_2$ is sintered little, and moreover, the catalytic activity is decreased little since the surface area of Pt after the durability test is large, that is, since Pt is coagulated little.

Next, it is known that the noble metal particles 2 are made of at least one element selected from among {Pt, Pd, Rh}, and that the first compounds (anchor agent) 3 are a Ce-containing oxide which has an OSC capability and is likely to be bonded to the noble metal particles 2 (in particular, Pt). Accordingly, it is desirable that each of the oxide containing Ce and the second compounds 4 be an oxide of at least one element selected from {Al, Zr}. Moreover, it is desirable that the oxide containing Ce be $CeO_2$ or a composite oxide of Ce and Zr. Moreover, it is recommended that the exhaust gas purifying catalyst 1 be the one in which Pt—$CeO_2$ is coated with $Al_2O_3$, or the one in which Pt—$CeZrO_x$ is coated with $Al_2O_3$, more preferably, the one in which Pt—$CeO_2$ is coated with $ZrO_2$.

Moreover, the inventors of the invention of this application found out that, when the average particle diameter of the noble metal particles 2 is 2 [nm] or less, the sintering of the noble metal particles is advanced by the movement of the noble metal particles 2 themselves, and on the contrary, when the average particle diameter of the noble metal particles 2 is 10 [nm] or more, reactivity of the noble metal particles 2 and the exhaust gas is significantly decreased. Hence, it is desirable that the average particle diameter of the noble metal particles 2 be within a range from 2 [nm] or more to 10 [nm] or less.

Furthermore, the inventors of the invention of this application found out that, when a ratio of the noble metal particles 2 which contact the first compounds (anchor agent) 3 is 80[%] or less, a ratio of the noble metal particles 2 which are not present on the first compounds (anchor agent) 3 becomes 20[%] or more, and as a result, the sintering of the noble metal particles 2 is advanced by the movement of the noble metal particles 2. Hence, it is desirable that 80[%] or more of the noble metal particles 2 contact the first compounds (anchor agent 3).

Moreover, as shown in FIG. 6, the transition metal compounds (TM) 5 of at least one element selected from among {Fe, Co, Ni, Mn} may be contained in the exhaust gas purifying catalyst 1. The element that forms the transition metal compounds 5 serves as the promoter components which further exploit the function of the noble metal particles 2. Accordingly, with such a configuration, the catalyst performance such as low-temperature activity in particular can be enhanced to a large extent.

Furthermore, La may be contained in the second compounds 4. La has an effect of enhancing the durability of $Al_2O_3$ and $ZrO_2$, and accordingly, with such a configuration, heat resistance of $Al_2O_3$ and $ZrO_2$ can be enhanced. Moreover, an exhaust gas purifying catalyst may be composed by coating slurry containing the above-described exhaust gas purifying catalyst 1 on a fireproof inorganic support.

Figure 8:
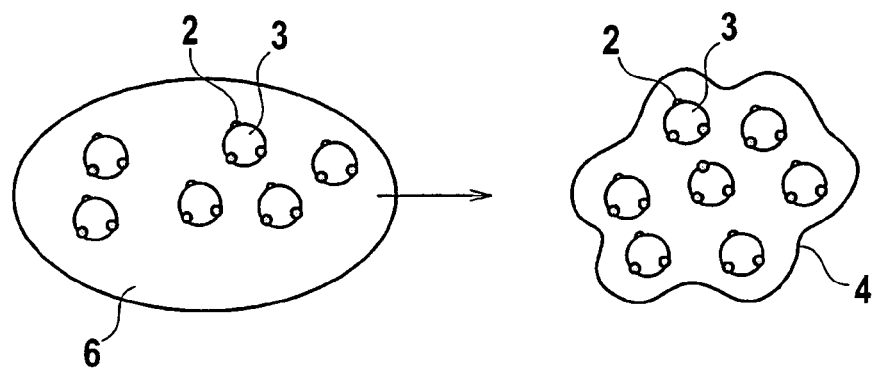
FIG. 8 is an explanatory view of a production method of an exhaust gas purifying catalyst, which serves as an embodiment of the present invention.

Next, a description will be made of an embodiment of a production method of the exhaust gas purifying catalyst of the present invention. FIG. 8 is an explanatory view of the production method of the exhaust gas purifying catalyst according to the present invention. As illustrated on a left side of an arrow in this drawing, first, the first step of preparing a composite colloidal solution 6 in which the noble metal particles 2 contact the first compounds 3 is performed. Subsequently, as illustrated on a right side of the arrow in this drawing, the second step of forming the second compound on the peripheries of the first compounds 3 in the composite colloidal solution 6, which the noble metal particles 2 contact, is performed.

In the first step, it is necessary to prepare composite colloid. By preparing the composite colloid, the first compounds 3 which the noble metal particles 2 contact can be suppressed from being coagulated with one another in the solution since the composite colloid concerned is uniformly dispersed into the composite colloidal solution 6.

In the first step, the first compounds 3 can be covered in advance with a dispersing protection material as will be described later, or alternatively, do not have to be covered with the dispersing protection material. Moreover, a method of allowing the noble metal particles to contact the first compounds 3 may be reduction treatment of the noble metal particles, or may be other methods.

Figure 9:
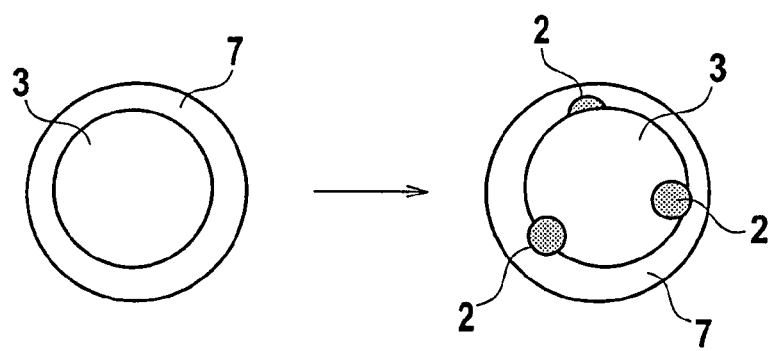
FIG. 9 is an explanatory view of an example of a first step in the production method of the present invention.

A description will be made of an example of the first step by using an explanatory view of FIG. 9. As illustrated on a left side of an arrow of FIG. 8, first, the first compound 3 is covered with the dispersing protection material 7, whereby the colloid of the first compound 3 is prepared. A polymer compound can be used as the dispersing protection material 7. Next, as illustrated on a right side of the arrow of FIG. 9, a solution containing the noble metal is brought into contact with the colloid of the first compound 3 covered with the dispersing protection material 7, whereby the composite colloid in which the noble metal particles 2 contact the first compound 3 is prepared. The dispersing protection material 7 is, for example, the polymer compound, nitric acid, acetic acid, and the like.

Figure 10:
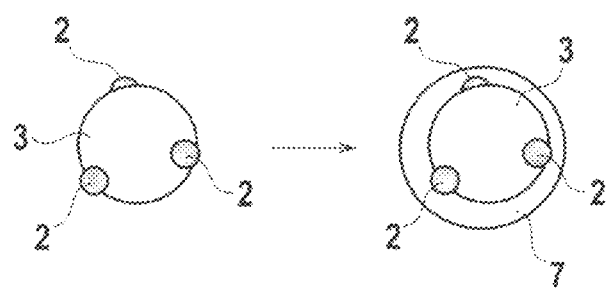
FIG. 10 is an explanatory view of another example of the first step in the production method of the present invention.

A description will be made of another example of the first step by using an explanatory view of FIG. 10. In the example shown in FIG. 10, as illustrated on a left side of an arrow of this drawing, first, the noble metal particles 2 are supported on the surface of the first compound 3. Next, as illustrated on a right side of the arrow of this drawing, the first compound 3 on which the noble metal particles 2 are supported is covered with the dispersing protection material 7, whereby the composite colloid in which the noble metal particles 2 contact the first compound 3 is prepared.

A method of forming the second compound 4 on the peripheries of the first compounds 3 in the second step may be the impregnation method or the inclusion method.

Figure 11:
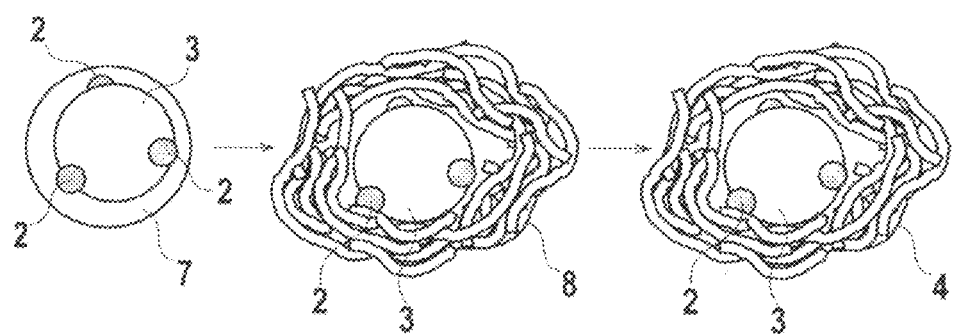
FIG. 11 is an explanatory view of another example of a second step in the production method of the present invention.

A description will be made of an example of the second step by using an explanatory view of FIG. 11. As illustrated in this drawing, after the first step, first, a raw material of the second compound is added to the solution containing the composite colloid covered with the dispersing protection material 7, whereby a precursor 8 of the second compound 4 is formed on the periphery of the composite colloid. Subsequently, a solid content of the composite colloidal solution in which the precursor 8 of the second compound is formed is separated and fired, whereby the precursor 8 of the second compound is converted into the second compound 4.

A description will be more specifically made of the embodiment of the production method of the exhaust gas purifying catalyst according to the present invention.

It is recommended that the above-described exhaust gas purifying catalyst 1 be produced in such a manner that the colloid of the first compounds (anchor agent) 3 is prepared by covering the first compounds (anchor agent) 3 with an average particle diameter of 30 [nm] or less with the polymer compound such as polyvinylpyrrolidone (PVP), and noble metal salt in which an average particle diameter is within the range from 2 [nm] or more to 10 [nm] or less is reduced and precipitated on the colloid of the first compounds (anchor agent) 3 by using a reducing agent such as ethanol, whereby the colloidal solution in which the noble metal particles 2 contact the first compounds (anchor agent) 3 is prepared. Note that a commercially available article can be used as the first compounds (anchor agent) 3 with the average particle diameter of 30 [nm] or less, or the first compounds (anchor agent) 3 can be prepared by a solid-phase method, a liquid-phase method, and a gas-phase method.

Moreover, the above-described exhaust gas purifying catalyst 1 may be produced in such a manner that the colloid of the first compounds (anchor agent) 3 is prepared by covering the first compounds (anchor agent) 3 with the average particle diameter of 30 [nm] or less with the polymer compound such as the polyvinylpyrrolidone (PVP), and noble metal colloid in which an average particle diameter is within the range from 2 [nm] or more to 10 [nm] or less is brought into contact with the surface of the colloid of the first compounds (anchor agent) 3, whereby the composite colloidal solution is prepared.

Moreover, in the above-described production method, the step may be performed, which is of dispersing organic salt of the second compounds 4 such as aluminum isopropoxide (AIP) and zirconium isopropoxide (ZIP) into an organic solvent, and then pouring the prepared colloidal solution into the organic solvent, thereby performing hydrolysis for the organic salt. In accordance with the production method as described above, the oxide can be disposed on the periphery of the colloid.

Moreover, in the above-described production method, the step may be performed, which is of dispersing inorganic salt as a raw material of the second compounds 4 into the solvent, peptizing the inorganic salt in the solvent by acid, and then pouring the colloidal solution into the solvent. Note that, as the above-described raw material inorganic salt, it is desirable to use boehmite when the second compounds 4 are an oxide of Al, and to use zirconium nitrate when the second compounds 4 are an oxides of Zr. In accordance with the method as described above, the oxide can be disposed on the periphery of the colloid more inexpensively since the inorganic salt is more inexpensive than the organic salt.

Next, a description will be made of another embodiment of the production method of the exhaust gas purifying catalyst of the present invention. The production method of the exhaust gas purifying catalyst, which is mentioned above, includes the step of preparing the composite colloidal solution in which the noble metal particles contact the first compounds. Moreover, the colloid of the first compounds is prepared by covering the first compounds with the average particle diameter of 30 nm or less with the polymer compound, and thereafter, the noble metal salt is reduced and precipitated on the colloid, whereby the composite colloidal solution is prepared, and so on. The reason for preparing the composite colloidal solution as described above is that, in general in a state where nanoparticle powder is powder, the nanoparticle powder becomes aggregates of secondary particles in which primary particles are coagulated, the aggregates of the secondary particles are coagulated and separated even if being mixed with the precursors of the second compounds in a liquid, and it is difficult to uniformly mix the aggregates and the precursors. Specifically, the secondary particles are covered with the polymer compound to be thereby converted into the colloid and to be suppressed from being coagulated, whereby the secondary particles are not coagulated or separated even if being mixed with the precursors of the second compounds. In such a way, it is possible to obtain a catalyst in which the first compounds as the anchor agent are dispersed into the second compounds as the inclusion material.

In the production method of this embodiment, the catalyst can be obtained, in which the composite colloid containing the polymer compound is not used, but the secondary particles of the first compounds as the anchor agent are mixed with the precursors of the second compounds, are fired, and thereafter, are uniformly dispersed. The above-described production method includes: the step of milling or dispersing the aggregates in which the first compound particles with an average primary particle diameter of 30 nm or less to a secondary particle diameter of 300 nm or less; the step of supporting the noble metal particles on the secondary particles of the first compounds with the particle diameter of 300 nm or less; and the step of forming the second compounds on the peripheries of the first compounds which support the noble metal particles thereon.

In this embodiment, the aggregates in which the first compound particles with the average primary particle diameter of 30 nm or less are coagulated and come to have a secondary particle diameter of approximately 2 μm are milled or dispersed to the secondary particle diameter of 300 nm or less, more specifically about 100 to 300 nm, and as an example, 120 nm. For such milling or dispersion, a wet mill or disperser can be used. In accordance with this embodiment, the first compound particles milled or dispersed to the secondary particle diameter of 300 nm or less can uniformly support the noble metal particles without being coagulated one more time in the liquid. Moreover, even if the protection material composed of the polymer compound is not used, the first compound particles are not coagulated or separated at the time of being mixed with the precursors of the second compounds, and the catalyst in which the secondary particles of the first compounds as the anchor agent are uniformly dispersed into the catalyst after being fired can be obtained.

Moreover, in the case of forming composite colloidal particles by using the protection material composed of the polymer compound, the polymer compound is burnt at the time of the firing, and a temperature thereof rises locally, thus causing an apprehension that the noble metal particles may become prone to be coagulated. As opposed to this, in accordance with the production method of this embodiment, such an apprehension does not occur since the protection material composed of the polymer compound is not used. Moreover, since the polymer compound is expensive, it is advantageous not to use the protection material composed of the polymer compound as described above in terms of reducing the cost.

For the mill or the disperser, which mills or disperses the aggregates in which the first compound particles with the average primary particle diameter of 30 nm or less are coagulated to the secondary particle diameter of 300 nm or less, an arbitrary apparatus can be used as long as it is capable of milling or dispersing the particles to the diameter of 300 nm or less. Specifically, the miller or the disperser is a beads mill, a high-speed homogenizer, a high-pressure collision mill, and the like.

The step of supporting the noble metal particles on the secondary particles of the first compounds milled or dispersed to the particle diameter of 300 nm or less by the mill or the disperser has some specific modes.

One of the specific modes is to first support the noble metal particles with the average particle diameter of 30 nm or less on the aggregates of the first compound particles, and to next mill or disperse the aggregates of the first compound particles on which the noble metal is supported to the secondary particle diameter of 300 nm or less by the mill or the disperser. The noble metal particles are supported on the secondary particles of the first compounds thus milled or dispersed to the particle diameter of 300 nm or less. This mode enables the secondary particles of the first compounds to be uniformly dispersed into the precursors of the second compounds. Moreover, as a CO adsorption rate of the exhaust gas purifying catalyst obtained through this process, 100 [g/m$^2$-metal] or more can be obtained in the case where the noble metal particles are Pt.

Another one of the specific modes is to support the noble metal particles with the average particle diameter of 30 nm or less on the first compound particles during the milling or dispersing step of the aggregates of the first compound particles concerned. During the milling or dispersing step of the aggregates of the first compound particle by the mill or the disperser, the noble metal particles are added into the mill or the disperser, whereby the noble metal particles are supported on the secondary particles of the first compounds milled or dispersed to the particle diameter of 300 nm or less. In accordance with this mode, the noble metal particles are directly supported on the secondary particles in a state where the first compounds are milled or dispersed to the desired secondary particle diameter in the miller or the disperser. Accordingly, the noble metal particles are uniformly supported on the surfaces of the respective secondary particles of the first compounds with the secondary particle diameter of 300 nm or less. As a result, the activity of the catalyst is enhanced. Moreover, as a CO adsorption rate of the exhaust gas purifying catalyst obtained through this process, 150 [g/m$^2$-metal] or more can be obtained in the case where the noble metal particles are Pt. Timing of adding the noble metal particles may be an initial stage, middle stage or ending stage of the milling or dispersing step of the aggregates of the first compound particles by the mill or the disperser. Such adding timing just needs to be determined in response to the desired secondary particles of the first compounds.

Another one of the specific modes is to support the noble metal particles with the average particle diameter of 30 nm or less on the secondary particles of the first compounds after milling or dispersing the noble metal particles to the secondary particle diameter of 300 nm or less. The noble metal particles are supported on the secondary particles of the first compounds with the secondary particle diameter of 300 nm or less in the inside of the mill or the disperser, in which the milling or the dispersion is ended, or on the outside of the mill or the disperser. In accordance with this mode, the noble metal particles are supported on the first compounds milled or dispersed to the desired secondary particle diameter. Accordingly, the noble metal particles are uniformly supported on the surfaces of the respective secondary particles of the first compounds. As a result, the activity of the catalyst is enhanced. Moreover, as a CO adsorption rate of the exhaust gas purifying catalyst obtained through this process, 150 [g/m$^2$-metal] or more can be obtained in the case where the noble metal particles are Pt.

EXAMPLES

A description will be specifically made of the present invention based on examples.

First, a description will be made of production methods of catalyst powders of Examples 1 to 14, Examples 20 to 25 and Comparative example 1, which are shown in the following Table and Table 2.

TABLE 1

|  | Noble metal | First compound | Second compound | Initial | | | After durability | | |
|---|---|---|---|---|---|---|---|---|---|
|  |  |  |  | Average particle diameter of noble metal (nm) | Average particle diameter of first compound (nm) | Maximum particle diameter of first compound (nm) | Particle diameter of noble metal after durability (nm) | Number of moles of noble metal in unit | Difference in adsorption energy (kCal/mol) |
| Example 1 | Pt | $CeO_2$ | $Al_2O_3$ | 2.3 | 7 | 50 | 4 | 5.10E−21 | 21.1 |
| Example 2 | Pt | $CeO_2$ | $Al_2O_3$ | 2.4 | 28 | 100 | 6 | 1.70E−20 | 21.1 |
| Example 3 | Pt | $CeO_2$ | $Al_2O_3$ | 2.4 | 1 or less | 4 | 10 | 7.90E−20 | 21.1 |
| Example 4 | Pt | $CeO_2$ | $Al_2O_3$ | 2.4 | 7 | 50 | 7 | 2.70E−20 | 21.1 |
| Example 5 | Pt | $CeO_2$ | $Al_2O_3$ | 2.4 | 7 | 50 | 9 | 5.80E−20 | 21.1 |
| Example 6 | Pt | Ce—Zr—Ox | $Al_2O_3$ | 2.3 | 11 | 60 | 3 | 2.10E−21 | 37.8 |
| Example 7 | Pt | $CeO_2$ | $ZrO_2$ | 2.2 | 7 | 50 | 3 | 2.10E−21 | 15.3 |
| Example 8 | Pt | $CeO_2$ | $Al_2O_3$ + La | 2.3 | 7 | 50 | 3 | 2.10E−21 | 25.6 |
| Example 9 | Pt | $CeO_2$ | $ZrO_2$ + La | 2.2 | 7 | 50 | 3 | 2.10E−21 | 12.3 |
| Example 10 | Pd | $CeO_2$ | $Al_2O_3$ | 3.5 | 7 | 50 | 4 | 5.10E−21 | 15.8 |
| Example 11 | Rh | $CeO_2$ | $ZrO_2$ | 2.1 | 7 | 50 | 3 | 2.30E−21 | 11.5 |
| Example 20 | Pt | $CeO_2$ | $Al_2O_3$ | 2.3 | 35 | 70 | 9 | 5.80E−20 | 21.1 |
| Example 21 | Pt | $CeO_2$ | $Al_2O_3$ | 1.5 or less | 7 | 50 | 9 | 5.80E−20 | 21.1 |
| Example 22 | Pt | $CeO_2$ | $Al_2O_3$ | 1.5 or less | 48 | 60 | 8 | 4.00E−20 | 21.1 |
| Example 23 | Pt | $CeO_2$ | $Al_2O_3$ | 1.5 or less | 50 | 2000 | 9 | 4.00E−20 | 21.1 |
| Example 24 | Pt | $CeO_2$ | $Al_2O_3$ | 1.5 or less | 2500 (2.5 μm) | 2500 | 38 | 4.30E−18 | 21.1 |
| Example 25 | Pt | $CeO_2$ | $Al_2O_3$ | 1.5 or less | 500 | 600 | 23 | 9.60E−19 | 21.1 |
| Comparative example 1 | Pt | $CeO_2$ | $Al_2O_3$ | 1.5 or less | 600 | — | 101 | — | — |

TABLE 2

|  | Noble metal | Production method of noble metal particle | First compound | Second compound | Average particle diameter of first compound (nm) | Contact between noble metal and first compound (%) | Particle diameter of noble metal after durability (nm) | Difference in Adsorption energy (kCal/mol) |
|---|---|---|---|---|---|---|---|---|
| Example 1 | Pt | Reduction-precipitation | $CeO_2$ | $Al_2O_3$ | 7 | 95 | 3.5 | 21.1 |
| Example 12 | Pt | Reduction-precipitation | $CeO_2$ | $Al_2O_3$ | 7 | 96 | 3.4 | 21.1 |
| Example 13 | Pt | Colloid | $CeO_2$ | $Al_2O_3$ | 7 | 82 | 3.4 | 21.1 |
| Example 14 | Pt | Colloid | $CeO_2$ | $Al_2O_3$ | 7 | 84 | 3.5 | 21.1 |

Example 1

In Example 1, first, polyvinylpyrrolidone as surfactant was mixed into a mixed solution of water and ethanol, of which ratio was 1:1, so as to set a ratio of the surfactant with respect to such a solvent at 0.15 [mol/L ratio], followed by stirring, and thereafter, Ce acetate was added to an obtained solution, followed by stirring. Then, after the stirring was completed, ammonia was added to the solution, followed by another stirring for two hours, whereby a colloidal solution of Ce was prepared. Next, after dinitrodiamine Pt salt was added to the colloidal solution of Ce, ethanol was added thereto, and the solution was heated up to 80[° C.], whereby Pt salt was precipitated. Next, after aluminum isopropoxide was dissolved into a hexylene glycol solution, the Pt salt was poured into the solution. Then, after the solution was dried under reduced pressure in an evaporator, the solution was further dried in a dryer of 120[° C.], whereby catalyst powder was prepared. Then, finally, the catalyst powder was fired in the air of 400[° C.], whereby Pt, $CeO_2/Al_2O_3$ catalyst powder of Example 1 was prepared.

Note that, with regard to a composition of the catalyst powder, Pt occupied 0.3 wt %, and $CeO_2$ occupied 10%. Moreover, as a result of TEM observation, average particle diameters of Pt (noble metal) and $CeO_2$ (first compound) were 2.3 and 7 [nm], respectively. Moreover, a contact ratio between Pt and $CeO_2$ was 95[%]. Note that, in this example, and in examples and comparative examples, which are shown below, each of the contact ratios was calculated in such a manner that, for each of 50 EDX spots (5 [nm]), the ratio of the noble metal and the first compound, which were present in an inside of the spot, was measured by using TEM-EDX, and from a result of the measurement, an inclination of a straight line expressed with respect to an axis of ordinates Pt [atom %] and an axis of abscissas Ce [atom %] was obtained. Specifically, in the case where an atom percent of Pt is 3 [atom %] and an atom percent of Ce is 10 [atom %], the inclination becomes 3/10 if the contact ratio between Pt and Ce is 100 [%]. Accordingly, in the case where the inclination of the straight line is 2/10, the contact ratio becomes 67[%] (={0.2/0.3}×100).

Moreover, in order to measure an average pore diameter of an alumina portion of this powder, similar preparation treatment was performed after excluding the $Pt/CeO_2$ portion. An average pore diameter of obtained powder was 6.2 nm. Hence, an average pore diameter of an alumina portion of the powder of this example is considered to have a similar numeric value.

Example 2

In Example 2, similar treatment to that of the above-described Example 1 was performed except that the ratio of the surfactant with respect to the solvent was set at 0.07 [mol/L ratio], whereby Pt, $CeO_2/Al_2O_3$ catalyst powder of Example 2 was prepared. Note that, in this catalyst powder, the average particle diameters of Pt and $CeO_2$ were 2.4 and 28 [nm], respectively. Moreover, the contact ratio between Pt and $CeO_2$ was 94[%].

Example 3

In Example 3, similar treatment to that of the above-described Example 1 was performed except that the ratio of the surfactant with respect to the solvent was set at 0.35 [mol/L ratio], whereby Pt, $CeO_2/Al_2O_3$ catalyst powder of Example 3 was prepared. Note that, in this catalyst powder, the average particle diameters of Pt and $CeO_2$ were 2.4 [nm] and 1 [nm], respectively. Moreover, the contact ratio between Pt and $CeO_2$ was 96[%].

Example 4

In Example 4, the catalyst powder prepared in Example 1 by being dried in the dryer of 120[° C.] was poured again into the mixed solution of the water and the ethanol, and thereafter, the dinitrodiamine Pt salt was pored into the solution. Then, after Pt was precipitated by heating the solution up to 80[° C.], the solution was fired in the air of 400[° C.], whereby Pt, $CeO_2/Al_2O_3$ catalyst powder of Example 4 was prepared. Note that, with regard to a composition of this catalyst powder, Pt occupied 0.3 wt %, and $CeO_2$ occupied 10%. Moreover, a ratio of an amount of Pt prepared by heating the colloidal solution of Ce added with the dinitrodiamine Pt salt and the ethanol up to 80[° C.] and an amount of Pt prepared by the step of heating the mixed solution of water and the ethanol with the dinitrodiamine Pt salt up to 80[° C.] was 8:2. Moreover, as a result of the TEM observation, the average particle diameters of Pt and $CeO_2$ were 2.4 and 7 [nm], respectively. Moreover, the contact ratio between Pt and $CeO_2$ was 82[%].

Example 5

In Example 5, similar treatment to that of Example 4 was performed except that the ratio of the amount of Pt prepared by heating the colloidal solution of Ce added with the dinitrodiamine Pt salt and the ethanol up to 80[° C.] and the amount of Pt prepared by the step of heating the mixed solution of water and the ethanol with the dinitrodiamine Pt salt up to 80[° C.] was set at 7:3, whereby Pt, $CeO_2/Al_2O_3$ catalyst powder of Example 5 was prepared. Note that, in this catalyst powder, the average particle diameters of Pt and $CeO_2$ were 2.4 and 7 [nm], respectively. Moreover, the contact ratio between Pt and $CeO_2$ was 75[%].

Example 6

In Example 6, similar treatment to that of Example 1 was performed except that the Ce acetate was changed to mixed salt of the Ce acetate and Zr acetate in a ratio of 2:1, whereby Pt, $Ce-Zr-O_x/Al_2O_3$ catalyst powder of Example 6 was prepared. Note that, in this catalyst powder, average particle diameters of Pt and $Ce-Zr-O_x$ were 2.3 and 11 [nm], respectively. Moreover, a contact ratio between Pt and $Ce-Zr-O_x$ was 93[%].

Example 7

In Example 7, similar treatment to that of Example 1 was performed except that the aluminum isopropoxide was changed to zirconium isopropoxide, whereby Pt, $CeO_2/ZrO_2$ catalyst powder of Example 7 was prepared. Note that, in this catalyst powder, the average particle diameters of Pt and $CeO_2$ were 2.2 and 7 [nm], respectively. Moreover, the contact ratio between Pt and $CeO_2$ was 94[%].

Example 8

In Example 8, similar treatment to that of Example 1 was performed except that La acetate was further added to the hexylene glycol solution after the Pt salt was poured thereinto, whereby Pt, $CeO_2/Al_2O_3$+La catalyst powder of Example 8 was prepared. Note that, with regard to a composition of this catalyst powder, Pt occupied 0.3 wt %, $CeO_2$ occupied 10%, and La—$Al_2O_3$ occupied 3 wt %. Moreover, the average particle diameters of Pt and $CeO_2$ were 2.3 and 7 [nm], respectively. Furthermore, the contact ratio between Pt and $CeO_2$ was 94[%]

Example 9

In Example 9, similar treatment to that of Example 8 was performed except that the aluminum isopropoxide was changed to zirconium isopropoxide, whereby Pt, $CeO_2/ZrO_2$+La catalyst powder of Example 9 was prepared. Note that, with regard to a composition of this catalyst powder, Pt occupied 0.3 wt %, $CeO_2$ occupied 10%, and $ZrO_2$+La occupied 3 wt %. Moreover, the average particle diameters of Pt and $CeO_2$ were 2.2 and 7 [nm], respectively. Furthermore, the contact ratio between Pt and $CeO_2$ was 92[%].

Example 10

In Example 10, similar treatment to that of Example 1 was performed except that the dinitrodiamine Pt salt was changed to Pd nitrate salt, whereby Pd, $CeO_2/Al_2O_3$ catalyst powder of Example 10 was prepared. Note that, in this catalyst powder, average particle diameters of Pd and $CeO_2$ were 3.5 and 7 [nm], respectively. Furthermore, a contact ratio between Pd and $CeO_2$ was 91[%].

Example 11

In Example 11, similar treatment to that of Example 1 was performed except that the dinitrodiamine Pt salt was changed to Rh nitrate salt, whereby Rh, $CeO_2/ZrO_2$ catalyst powder of Example 11 was prepared. Note that, in this catalyst powder, average particle diameters of Rh and $CeO_2$ were 2.1 and 7 [nm], respectively. Furthermore, a contact ratio between Rh and $CeO_2$ was 92[%].

Example 20

In Example 20, similar treatment to that of the above-described Example 1 was performed except that the ratio of the surfactant with respect to the solvent was set at 0.04 [mol/L ratio], whereby Pt, $CeO_2/Al_2O_3$ catalyst powder of Example 20 was prepared. Note that, in this catalyst powder, the average particle diameters of Pt and $CeO_2$ were 2.3 and 35 [nm], respectively. Furthermore, the contact ratio between Pt and $CeO_2$ was 94[%].

Example 21

In Example 21, similar treatment to that of the above-described Example 1 was performed except that the ethanol was not added at the time of precipitating the Pt salt, whereby Pt, $CeO_2/Al_2O_3$ catalyst powder of Example 21 was prepared. Note that, in this catalyst powder, the average particle diam-

Example 22

In Example 22, similar treatment to that of the above-described Example 1 was performed except that a commercially available aqueous solution of ceria colloidal sol was used instead of preparing the Ce colloidal solution, and that the noble metal precipitation step was not performed, whereby Pt, $CeO_2/Al_2O_3$ catalyst powder of Example 22 was prepared. Note that, in this catalyst powder, the average particle diameters of Pt and $CeO_2$ were 1.5 [nm] or less and 48 [nm], respectively. Moreover, the contact ratio between Pt and $CeO_2$ was 95[%].

Example 23

In Example 23, an aqueous solution of the dinitrodiamine Pt was impregnated into and supported on commercially available nanoceria powder with an average particle diameter of 50 nm, and a resultant was dried and fired once, and thereafter, powder of Pt (0.3%)/ceria was obtained. The obtained powder was poured once into ion exchange water, and the polyvinylpyrrolidone was poured as the surfactant thereinto while irradiating an ultrasonic wave thereonto and suspending the obtained powder. Then, a resultant solution was stirred and mixed until the above-described components were uniformly mixed. In such away, a powder-dispersed colloidal solution in which the average particle diameter of the ceria was 50 nm was obtained. Meanwhile, predetermined amounts of boehmite powder, cerium nitrate, acetic acid and ion exchange water were poured into a NASU flask attached to a rotary evaporator, and were stirred once, and then the above-described colloidal solution was dropped thereonto. Thereafter, the NASU flask was set in an oil bath, and the contents were vacuum-dried at 80° C. Thereafter, the contents were gradually heated up to 400° C., and were then fired in an airflow for one hour, whereby catalyst powder of Example 23 was obtained. Note that, in this catalyst powder, the average particle diameters of Pt and $CeO_2$ were 1.5 [nm] or less and 50 [nm], respectively. Moreover, the contact ratio between Pt and $CeO_2$ was 94[%].

Example 24

In Example 24, similar treatment to that of the above-described Example 1 was performed except that a Ce colloidal solution obtained by adding $CeO_2$ with an average particle diameter of 2.5 μm, which was milled by the ball mill, was prepared, and that Pt was supported thereon without being subjected to the reduction treatment, whereby Pt, $CeO_2/Al_2O_3$ catalyst powder of Example 24 was prepared. Note that, in this catalyst powder, the average particle diameters of Pt and $CeO_2$ were 1.5 [nm] or less and 2500 [nm], respectively. Moreover, the contact ratio between Pt and $CeO_2$ was 82[%].

Example 25

In Example 25, similar treatment to that of the above-described Example 1 was performed except that a Ce colloidal solution was prepared so that the ratio of the surfactant with respect to the solvent could be 0.0015 [mol/L ratio], that a noble metal supporting concentration thereof was set at 3.0%, and that Pt was supported thereon without being subjected to the reduction treatment, whereby Pt, $CeO_2/Al_2O_3$ catalyst powder of Example 25 was prepared. Note that, in this catalyst powder, the average particle diameters of Pt and $CeO_2$ were 1.5 [nm] or less and 500 [nm], respectively. Moreover, the contact ratio between Pt and $CeO_2$ was 73[%].

Comparative Example 1

In Comparative example 1, an aqueous solution of the Ce nitrate was impregnated into and supported on active alumina, and a resultant was dried at 120° C., and was then fired in an airflow for one hour, whereby $CeO_2$-supported alumina powder was obtained. Then, an aqueous solution of the dinitrodiamine Pt was further impregnated into and supported on the powder thus obtained, whereby catalyst powder of Comparative example 1 was obtained. In this powder, the amount of Pt is 0.3 wt %, and the amount of $CeO_2$ is 10%. Note that, in this catalyst powder, the average particle diameters of Pt and $CeO_2$ were 1.5 [nm] or less and 600 [nm], respectively. Moreover, the contact ratio between Pt and $CeO_2$ was 11[%].

Example 12

In Example 12, first, the polyvinylpyrrolidone as the surfactant was mixed into the mixed solution of the water and the ethanol, of which ratio was 1:1, so as to set the ratio of the surfactant with respect to the solvent at 0.15 [mol/L ratio], followed by stirring, and thereafter, the Ce acetate was added to an obtained solution, followed by stirring. Then, after the stirring was completed, the ammonia was added to the solution, followed by another stirring for two hours, whereby the colloidal solution of Ce was prepared. Next, after the dinitrodiamine Pt salt was added to the colloidal solution of Ce, the ethanol was added thereto, and the solution was heated up to 80[° C.], whereby the Pt salt was precipitated. Next, after the boehmite was dispersed into water, the acetic acid was poured thereinto to set pH of a mixed solution at 4, and in this state, the boehmite was peptized. Then, after the Pt salt was poured into the water in which the boehmite was peptized, a resultant solution was dried in the dryer of 120[° C.], whereby catalyst powder was prepared. Then, finally, the catalyst powder was fired in the air of 400[° C.], whereby Pt, $CeO_2/Al_2O_3$ catalyst powder of Example 12 was prepared. Note that, with regard to a composition of this catalyst powder, Pt occupied 0.3 wt %, and $CeO_2$ occupied 10%. Moreover, the average particle diameters of Pt and $CeO_2$ were 2.4 and 7 [nm], respectively. Furthermore, the contact ratio between Pt and $CeO_2$ was 96[%].

Example 13

In Example 13, first, the polyvinylpyrrolidone as the surfactant was mixed into the mixed solution of the water and the ethanol, of which ratio was 1:1, so as to set the ratio of the surfactant with respect to the solvent at 0.15 [mol/L ratio], followed by stirring, and thereafter, the Ce acetate was added to an obtained solution, followed by stirring. Then, after the stirring was completed, the ammonia was added to the solution, followed by another stirring for two hours, whereby the colloidal solution of Ce was prepared. Moreover, Pt colloid with an average particle diameter of 2 [nm] was added to the colloidal solution of Ce, whereby the Pt salt was precipitated. Next, after the aluminum isopropoxide was dissolved into the hexylene glycol solution, the Pt salt was poured into the solution. Then, after the solution was dried under reduced pressure in the evaporator, the solution was further dried in the dryer of 120[° C.], whereby catalyst powder was prepared. Then, finally, the catalyst powder was fired in the air of 400[° C.], whereby Pt, $CeO_2/Al_2O_3$ catalyst powder of Example 13 was prepared. Note that, with regard to a composition of this catalyst powder, Pt occupied 0.3 wt %, and $CeO_2$ occupied 10%. Moreover, the average particle diameters of Pt and $CeO_2$ were 2.2 and 7 [nm], respectively. Furthermore, the contact ratio between Pt and $CeO_2$ was 82[%].

Example 14

In Example 14, first, the polyvinylpyrrolidone as the surfactant was mixed into the mixed solution of the water and the ethanol, of which ratio was 1:1, so as to set the ratio of the surfactant with respect to the solvent at 0.15 [mol/L ratio], followed by stirring, and thereafter, the Ce acetate was added to an obtained solution, followed by stirring. Then, after the stirring was completed, the ammonia was added to the solution, followed by another stirring for two hours, whereby the colloidal solution of Ce was prepared. Moreover, the Pt colloid with the average particle diameter of 2 [nm] was added to the colloidal solution of Ce. Next, after the boehmite was dispersed into the water, the acetic acid was poured thereinto to set pH of a mixed solution at 4, and in this state, the boehmite was peptized. Then, after the Pt salt was poured into the water in which the boehmite was peptized, a resultant solution was dried in the dryer of 120[° C.], whereby catalyst powder was prepared. Then, finally, the catalyst powder was fired in the air of 400[° C.], whereby Pt, $CeO_2/Al_2O_3$ catalyst powder of Example 12 was prepared. Note that, with regard to a composition of this catalyst powder, Pt occupied 0.3 wt %, and $CeO_2$ occupied 10%. Note that, in this catalyst powder, the average particle diameters of Pt and $CeO_2$ were 2.2 and 7 [nm], respectively. Moreover, the contact ratio between Pt and $CeO_2$ was 84[%].

[Production Method of Exhaust Gas Purifying Catalyst]

Next, a description will be made of Examples 15 to 19 and Comparative example 2 of exhaust gas purifying catalysts using the catalyst powders of Example 1 and Comparative example 1.

Example 15

In Example 15, 180 [g] of the catalyst powder of Example 1, 20 [g] of alumina sol, 290 [g] of water and 10 [g] of nitric acid were poured into a magnetic ball mill, and were mixed and milled, whereby catalyst slurry was prepared. Then, the catalyst slurry was adhered onto a cordierite monolithic support (0.12 L, 400 cells), excessive slurry in the cells was removed by an airflow, followed by drying at 130[° C.] and firing thereafter at 400[° C.], whereby an exhaust gas purifying catalyst of Example 15 with a coated layer of 100 [g/L] was prepared.

Example 16

In Example 16, Fe nitrate was impregnated into the catalyst of Example 15, whereby an exhaust gas purifying catalyst of Example 16 was prepared.

Example 17

In Example 17, similar treatment to that of Example 16 was performed except that the Fe nitrate was changed to Co nitrate, whereby an exhaust gas purifying catalyst of Example 17 was prepared.

Example 18

In Example 18, similar treatment to that of Example 16 was performed except that the Fe nitrate was changed to Ni nitrate, whereby an exhaust gas purifying catalyst of Example 18 was prepared.

Example 19

In Example 19, similar treatment to that of Example 16 was performed except that the Fe nitrate was changed to Mn nitrate, whereby an exhaust gas purifying catalyst of Example 19 was prepared.

Comparative Example 2

In Comparative example 2, similar treatment to that of Example 15 was performed except that the catalyst powder of Comparative example 1 was used instead of the catalyst powder of Example 1, whereby an exhaust gas purifying catalyst of Comparative example 2 was prepared.

In Example 26, first, the polyvinylpyrrolidone as the surfactant was mixed into the mixed solution of the water and the ethanol, of which ratio was 1:1, so as to set the ratio of the surfactant with respect to the solvent at 0.15 [mol/L ratio], followed by stirring, and thereafter, the Ce acetate was added to an obtained solution, followed by stirring. Then, after the stirring was completed, the ammonia was added to the solution, followed by another stirring for two hours, whereby the colloidal solution of Ce was prepared. Next, after the dinitrodiamine Pt salt was added to the colloidal solution of Ce, the ethanol was added thereto, and the solution was heated up to 80[° C.], whereby the Pt salt was precipitated.

Meanwhile, the above-described colloidal solution was poured into an aqueous solution in which the boehmite was dispersed. Then, after the solution was dried under reduced pressure in the evaporator, the solution was further dried in the dryer of 120[° C.], whereby catalyst powder was prepared. Then, finally, the catalyst powder was fired in the air of 400[° C.], whereby Pt, $CeO_2/Al_2O_3$ catalyst powder of Example 26 was prepared.

Note that, with regard to a composition of this catalyst powder, Pt occupied 0.3 wt %, and $CeO_2$ occupied 10%. In this catalyst powder, the average particle diameters of Pt and $CeO_2$ were 1.5 [nm] or less and 50 [nm], respectively. Moreover, the contact ratio between Pt and $CeO_2$ was 94[%]. Furthermore, as a result of the TEM observation, the average particle diameters of Pt (noble metal) and $CeO_2$ (compound A) were 2.3 and 7 [nm], respectively. Moreover, the contact ratio between Pt and $CeO_2$ was 95[%].

Moreover, in order to measure the average pore diameter of an alumina portion of this powder, similar preparation treatment was performed after excluding the Pt/$CeO_2$ portion. The average pore diameter of obtained powder was 20.6 nm. Hence, the average pore diameter of an alumina portion of the powder of this example is considered to have a similar numeric value.

Example 27

In Example 27, the aqueous solution of the dinitrodiamine Pt was impregnated into and supported on commercially available nanoceria powder with an average particle diameter of 101 nm, and a resultant was dried and fired once, and thereafter, powder of Pt (0.3%)/ceria powder was obtained. The obtained powder was poured once into the ion exchange water, and the polyvinylpyrrolidone was poured as the surfactant thereinto while irradiating the ultrasonic wave thereonto and suspending the obtained powder. Then, a resultant solution was stirred and mixed until the above-described components were uniformly mixed. In such a way, a powder-dispersed colloidal solution in which the average particle diameter of the ceria was 101 nm was obtained.

Meanwhile, the above-described colloidal solution was poured into the aqueous solution in which the boehmite was dispersed. Then, after the solution was dried under reduced pressure in the evaporator, the solution was further dried in the dryer of 120[° C.], whereby catalyst powder was prepared. Then, finally, the catalyst powder was fired in the air of 400[° C.], whereby Pt, $CeO_2/Al_2O_3$ catalyst powder of Example 27 was prepared.

Note that, with regard to a composition of this catalyst powder, Pt occupied 0.3 wt %, and $CeO_2$ occupied 10%. Moreover, as a result of the TEM observation, the average particle diameters of Pt and $CeO_2$ were 1.5 [nm] or less and 101 [nm], respectively. Furthermore, the contact ratio between Pt and $CeO_2$ was 94[%].

Moreover, in order to measure the average pore diameter of an alumina portion of this powder, similar preparation treatment was performed after excluding the $Pt/CeO_2$ portion. The average pore diameter of obtained powder was 6.2 nm. Hence, the average pore diameter of an alumina portion of the powder of this example is considered to have a similar numeric value.

Example 28

In Example 28, the aqueous solution of the dinitrodiamine Pt was impregnated into and supported on the commercially available nanoceria powder with an average particle diameter of 101 nm, and a resultant was dried and fired once, and thereafter, powder of Pt (0.3%)/ceria powder was obtained. The obtained powder was poured once into the ion exchange water, and the polyvinylpyrrolidone was poured as the surfactant thereinto while irradiating the ultrasonic wave thereonto and suspending the obtained powder. Then, a resultant solution was stirred and mixed until the above-described components were uniformly mixed. In such a way, a powder-dispersed colloidal solution in which the average particle diameter of the ceria was 101 nm was obtained.

Meanwhile, the above-described colloidal solution was poured into the aqueous solution in which the boehmite was dispersed. Then, after the solution was dried under reduced pressure in the evaporator, the solution was further dried in the dryer of 120[° C.], whereby catalyst powder was prepared. Then, finally, the catalyst powder was fired in the air of 400[° C.], whereby Pt, $CeO_2/Al_2O_3$ catalyst powder of Example 28 was prepared.

Note that, with regard to a composition of this catalyst powder, Pt occupied 0.3 wt %, and $CeO_2$ occupied 10%. Moreover, as a result of the TEM observation, the average particle diameters of Pt and $CeO_2$ were 1.5 [nm] or less and 101 [nm], respectively. Furthermore, the contact ratio between Pt and $CeO_2$ was 94[%].

Moreover, in order to measure the average pore diameter of an alumina portion of this powder, similar preparation treatment was performed after excluding the $Pt/CeO_2$ portion. The average pore diameter of obtained powder was 20.6 nm. Hence, the average pore diameter of an alumina portion of the powder of this example is considered to have a similar numeric value.

Example 29

Example 29 is an example where, in producing the exhaust gas purifying catalyst, the aggregates of the secondary particles of the first compounds were dispersed by using the disperser, whereby the exhaust gas purifying catalyst was produced without preparing the composite colloidal solution. In particular, Example 29 is an example where the aggregates of the secondary particles of the first compounds were dispersed by the disperser after the noble metal particles were supported thereon.

First, in order to support Pt particles on micro secondary particles of $CeO_2$ as the first compounds, $Ce-Zr-O_x$ compound powder was dispersed into water, and a nitric acidic solution of the dinitrodiamine Pt was dropped thereonto, followed by stirring. Subsequently, a resultant was subjected to evaporation to dryness, and was thereafter fired in an airflow at 400° C. for one hour. Powder obtained by the firing was the aggregates of the noble metal particles and the secondary particles of the first compounds, and an average particle diameter thereof was 2 μm.

The obtained powder was dispersed by a commercially available beads mill (bead diameter: 0.3 mm), and the average particle diameter thereof was set at 120 nm.

Slurry containing the dispersed secondary particles and boehmite slurry peptized by a nitric acid solution in advance were mixed together, and were stirred strongly by the homogenizer and the like. Such mixed slurry after being stirred was dried by spray dry and the like.

Powder obtained by the drying was fired in an airflow at 550° C. for three hours, whereby a $Pt/CeO_2/Al_2O_3$ catalyst was obtained.

Example 30

In a similar way to Example 29, Example 30 is an example where, in producing the exhaust gas purifying catalyst, the aggregates of the secondary particles of the first compounds were dispersed by using the disperser, whereby the exhaust gas purifying catalyst was produced without preparing the composite colloidal solution. In particular, Example 30 is an example where the noble metal particles were supported on the first compounds after the aggregates of the secondary particles of the first compounds were dispersed.

First, powder of the $Ce-Zr-O_x$ compound was dispersed into water, and was dispersed to approximately 120 nm by the commercially available beads mill (bead diameter: 0.3 mm). Next, the nitric acidic solution of the dinitrodiamine Pt was dropped into the beads mill, and a resultant mixture was further dispersed.

Slurry containing the dispersed secondary particles and the boehmite slurry peptized by the nitric acid solution in advance were mixed together, and were stirred strongly by the homogenizer. Such mixed slurry after being stirred was dried by the spray dry and the like.

Powder obtained by the drying was fired in an airflow at 550° C. for three hours, whereby a $Pt/CeO_2/Al_2O_3$ catalyst was obtained.

Example 31

In a similar way to Example 30, Example 31 is an example where, in producing the exhaust gas purifying catalyst, the aggregates of the secondary particles of the first compounds were dispersed by using the disperser, whereby the exhaust gas purifying catalyst was produced without preparing the composite colloidal solution. Moreover, Example 31 is an example where the noble metal particles were supported on the first compounds after the aggregates of the secondary particles of the first compounds were dispersed. Furthermore, Example 31 is an example where the above-described supporting of the noble metal particles was performed outside of the disperser.

First, the powder of the Ce—Zr—$O_x$ compound was dispersed into water, and was dispersed to approximately 120 nm by the commercially available beads mill (bead diameter: 0.3 mm). After the dispersion, obtained slurry was moved to a beaker, and was stirred continuously. The nitric acidic solution of the dinitrodiamine Pt was dropped into the beaker, and was further stirred continuously.

The slurry containing the dispersed secondary particles and the boehmite slurry peptized by the nitric acid solution in advance were mixed together, and were stirred strongly by the homogenizer and the like. Such mixed slurry after being stirred was dried by the spray dry and the like.

Powder obtained by the drying was fired in an airflow at 550° C. for three hours, whereby a $Pt/CeO_2/Al_2O_3$ catalyst was obtained.

Example 32

In a similar way to Example 29, Example 32 is an example where, in producing the exhaust gas purifying catalyst, the aggregates of the secondary particles of the first compounds were dispersed by using the disperser, whereby the exhaust gas purifying catalyst was produced without preparing the composite colloidal solution. In particular, Example 32 is an example where, before the aggregates of the secondary particles of the first compounds were dispersed, the noble metal particles were added into the disperser, and were supported on the first compounds while dispersing the first compounds in the disperser.

First, powder of the Zr—La—$O_x$ compound was dispersed into water, and was poured into the commercially available beads mill (bead diameter: 0.3 mm). Moreover, the nitric acidic solution of the dinitrodiamine Pt was added into the beads mill in a similar way, and was dispersed to approximately 120 nm in the beads mill.

Slurry containing the dispersed secondary particles and the boehmite slurry peptized by the nitric acid solution in advance were mixed together, and were stirred strongly by the homogenizer and the like. Such mixed slurry after being stirred was dried by spray dry and the like.

Powder obtained by the drying was fired in an airflow at 550° C. for three hours, whereby a $Pt/CeO_2/Al_2O_3$ catalyst was obtained.

[Durability Test]

Next, a description will be made of results of performing durability tests for the respective exhaust gas purifying catalysts of Examples 1 to 32 and Comparative examples 1 and 2.

[Test Method]

For each of the catalyst powders of the above-described Examples 1 to 14, Examples 20 to 25, Examples 29 to 32 and Comparative example 1, a durability test of firing the catalyst powder for three hours in an atmospheric furnace of 900[° C.] was performed, and the average particle diameter after the durability test was measured by using the TEM. Moreover, for each of the exhaust gas purifying catalysts of Examples 15 to 19, Examples 26 to 28 and Comparative example 2, the exhaust gas purifying catalyst of each of Examples 15 to 19 and Comparative example 2 was mounted on an exhaust system of an engine with a displacement of 3500 [cc], and a durability test was performed, in which an inlet temperature of the exhaust system was set at 800[° C.], and the engine was operated for thirty hours. Thereafter, the exhaust gas purifying catalyst was installed in a simulated exhaust gas flowing apparatus, simulated exhaust gas with a composition shown in the following Table 3 was flown therethrough, and a HC purification rate (ηHC) [%] at 400[° C.] of each exhaust gas purifying catalyst of Examples 15 to 19 and Comparative example 2 was calculated from HC concentrations on an inlet side and an outlet side at 400[° C.].

TABLE 3

| Gas composition | Stoichiometric |
|---|---|
| Z value (-) | 1 |
| A/F (-) | 14.5 |
| NO (ppm) | 1000 |
| CO (%) | 0.6 |
| $H_2$ (%) | 0.2 |
| $O_2$ (%) | 0.6 |
| $CO_2$ (%) | 13.9 |
| HC(ppmC) | 1665 |
| $H_2O$(%) | 10 |
| $N_2$ (balance) | residue |

SV = 60000 h − 1

[Test Results]

Results of the above-described durability tests are shown in Tables 1 and 2 and Table 4.

TABLE 4

| Catalyst powder | Transition element | HC conversion rate at 400° C. (%) | |
|---|---|---|---|
| | | Initial period | After durability |
| Example 15 | Example 1 | None | 92% | 75% |
| Example 16 | Example 1 | Fe | 97% | 78% |
| Example 17 | Example 1 | Co | 97% | 79% |
| Example 18 | Example 1 | Ni | 99% | 80% |
| Example 19 | Example 1 | Mn | 98% | 79% |
| Comparative example 2 | Comparative example 1 | None | 93 | 19% |

As apparent from Tables 1 and 2, in the catalyst powder of Comparative example 1, the average particle diameter of the noble metal was largely changed (increased) before and after the durability test, and as opposed to this, in each of the catalyst powders of Examples 1 to 14 and Examples 20 to 25, the average particle diameter of the noble metal was not largely changed before and after the durability test. Moreover, as apparent from Table 4, in the exhaust gas purifying catalyst of Comparative example 2, the HC conversion rate was decreased to a large extent after the durability test, and as opposed to this, in each of the exhaust gas purifying catalysts of Examples 15 to 19, the HC conversion rate was not decreased to a large extent after the durability test. From this fact, it is found out that, in accordance with the catalyst powders and the exhaust gas purifying catalysts in these examples of the embodiment, the effect of enhancing the activity of the noble metal particles by the first compounds can be maintained.

Moreover, as in the catalyst powder of Example 5, when the ratio of the noble metal that contacts the first compounds is 80[%] or less, the sintering of the noble metal is advanced as compared with the other examples. From this fact, it is understood that, desirably, 80[%] or more of the noble metal contacts the first compounds in order to further maintain the effect of enhancing the activity of the noble metal by the first compounds.

Moreover, as in the exhaust gas purifying catalysts of Examples 16 to 19, in the case where the compound of at least one element selected from among {Fe, Co, Ni, Mn} is contained in the exhaust gas purifying catalyst, a decreasing rate of the HC conversion rate after the durability test is low as compared with the case where the compound of the above-described element is not contained as in the exhaust gas purifying catalyst of Example 15. From this fact, it is understood that, desirably, the compound of the at least one element selected from among {Fe, Co, Ni, Mn} is contained in the exhaust gas purifying catalyst in order to further maintain the effect of enhancing the activity of the noble metal by the first compounds.

Furthermore, in the case where La is contained in the second compounds as in the catalyst powders of Example 8 and Example 9, a variation of the noble metal particle diameter before and after the durability test is small as compared with the case where La is not contained therein. From this fact, it is understood that, recommendably, La is contained in the second compounds in order to further enhance the effect of enhancing the activity of the noble metal by the first compounds.

Moreover, for each of Example 15 and Examples 26 to 28, the average particle diameter Da of the composite particles of the first compounds which support the noble metal particles thereon, the average pore diameter Db of the pores formed in the second compounds, the ratio of the size Da of the composite particles and the average pore diameter Db, crystal growing properties of the second compounds after the durability test, and ηHC, were investigated.

as a measurement instrument, and the measurement was performed under the following conditions: X-ray wavelength: $CuK_\alpha$; scanning method: continuous method; measurement range: 50 to 90°; sampling interval: 0.02; scanning speed: 4°/min; voltage: 40 kV; current: 300 mA; divergence slit: 1.00; scattering slit: 1.00; and receiving slit: 0.3 mm.

Results of such measurements are shown in Table 5.

TABLE 5

|  | Particle diameter of noble metal-supported first compound (nm); Da | Average pore diameter of second compound (nm); Db | Da/Db (-) | After durability Crystal growth of second compound (-) | η HC(%) |
| --- | --- | --- | --- | --- | --- |
| Example 15 | 7 | 6.2 | 1.1 | 3.9 | 75 |
| Example 26 | 7 | 20.6 | 0.3 | 20.6 | 52 |
| Example 27 | 101 | 6.2 | 16.3 | 1.4 | 65 |
| Example 28 | 101 | 20.6 | 4.9 | 1.6 | 67 |
| Comparative example 2 | 2500 | 6.2 | 403.2 | 1.1 | 32 |

From Table 5, it is understood that all of Example 15 and Examples 26 to 28 are superior in ηHC to Comparative example 2. In particular, in Example 15, Example 27 and Example 28, in which the ratio of Da/Db is 10 or more, the movement and coagulation of the first compounds are suppressed, and accordingly, the crystal growing properties of the second compounds are small, and more excellent exhaust gas purification characteristics are imparted.

Next, results of measuring the initial particle diameter of the exhaust gas purifying catalyst produced in accordance with each of Examples 29 to 32 and measuring the particle diameter of the noble metal particles thereof after the durability test are shown in Table 6.

TABLE 6

|  | Noble metal | First compound | Second compound | Initial period | | | Particle diameter of noble metal after durability (nm) |
| --- | --- | --- | --- | --- | --- | --- | --- |
|  |  |  |  | Average particle diameter of noble metal (nm) | Average particle diameter of first compound (nm) | Contact between noble metal and first compound (%) |  |
| Example 29 | Pt | Ce-Ze-Ox | $Al_2O_3$ | 1 or less | 25 | 85 | 4 |
| Example 30 | Pt | Ce-Ze-Ox | $Al_2O_3$ | 1 or less | 28 | 88 | 3.1 |
| Example 31 | Pt | Ce-Ze-Ox | $Al_2O_3$ | 1 or less | 28 | 87 | 3.8 |
| Example 32 | Rh | Zr—La—Ox | $Al_2O_3$ | 1 or less | 20 | 85 | 4.3 |

For measuring the average pore diameter of the secondary particles, ASAP2120 made by Shimadzu Corporation was used. As pretreatment, the second particles were heated to 300° C. to be subjected to degassing treatment, and an ambient atmosphere was vacuum-deaerated until a pressure thereof reached 1 μm Hg, thereby removing adsorbed water from the second particles. Moreover, the measurement was performed by an $N_2$ adsorption method.

Moreover, with regard to the measurement of the crystal growing properties, each sample of Examples was subjected to the measurement before and after the durability test by the XRD, and for a diameter of crystallites of $CeO_2$ of each sample, the crystal growing properties were calculated by an equation of: crystal growth=(crystallite diameter after durability test)/(initial crystallite diameter). An X-ray diffraction apparatus (MXP18VAHF) made by MAX Science was used From Table 6, also with regard to each of the exhaust gas purifying catalysts in accordance with Examples 29 to 32, the particle diameter of the noble metal particles after the durability test is small, that is, the coagulation thereof is suppressed. As a result, excellent purification performance for the exhaust gas is provided.

Moreover, for each of the exhaust gas purifying catalysts produced in accordance with Examples 29 to 32, a CO adsorption amount thereof was measured. It was confirmed that the adsorption amount was 100 [$g/m^2$-metal] or more in Example 29, and that the adsorption amount is 150 [$g/m^2$-metal] or more in Examples 30 to 32. From these measurement results of the CO adsorption amount, it was found out that, in the exhaust gas purifying catalysts of Examples 29 to 32, the noble metal particles are supported on the first compounds dispersively, that is, the coagulation of the noble metal particles is suppressed.

Note that, for the measurement of the CO adsorption amount, BEL-METAL-3 of BEL Japan, Inc. was used as a measurement apparatus. First, pretreatment was performed under the following conditions. First, each of the exhaust gas purifying catalysts was heated up to 400° C. at a rate of 10° C./min in a gas flow with 100% of He, and subsequently, was subjected to oxidation treatment for 15 minutes in a gas flow with 100% of $O_2$. Subsequently, each of the exhaust gas purifying catalysts was purged with gas of 100% of He for 5 minutes, and was subjected to reduction treatment for 15 minutes in a gas flow with 40% of $H_2$ and the rest of He. Subsequently, each of the exhaust gas purifying catalysts was cooled down to 50° C. in a gas flow with 100% of He. Next, the CO adsorption amount was measured in the following manner. First, gas with 10% of CO and the rest of He was flown into each of the exhaust gas purifying catalysts in a pulsing manner. Then, in the case where the noble metal is Pt, from an equation of: unit adsorption amount ($cm^3/g$)=total adsorption amount/sample weight, the CO adsorption amount was obtained as: CO adsorption amount ($g/m^2$-metal)=unit adsorption amount×214.94/Pt supported amount (wt %).

The description has been made above of the embodiments to which the invention made by the inventors is applied; however, the present invention is not limited by the description and the drawings, which are in accordance with the embodiments and form a part of the disclosure of the present invention. Specifically, it is additionally noted here that it is a matter of course that other embodiments, examples, application technologies, and the like, which are made by those skilled in the art, and the like base on the above-described embodiments, are entirely incorporated in the scope of the present invention.

The invention claimed is:

1. An exhaust gas purifying catalyst, comprising:
   noble metal particles;
   first compounds supporting the noble metal particles; and
   second compounds formed on the peripheries of the first compounds on which the noble metal particles are supported and covering both the noble metal particles and the first compounds,
   wherein simplexes or aggregates of the first compounds supporting the noble metal particles are included in sections partitioned by the second compounds, and the movement of the simplexes or aggregates is suppressed within the sections.

2. The exhaust gas purifying catalyst according to claim 1, wherein the noble metal particles are contained in the sections in an amount of $8\times10^{-20}$ mol or less.

3. The exhaust gas purifying catalyst according to claim 1, wherein a particle diameter of the first compounds included in the section partitioned by the second compounds is 2 μm or less.

4. The exhaust gas purifying catalyst according to claim 1, wherein an average particle diameter of the first compounds included in the section partitioned by the second compounds is 50 nm or less.

5. The exhaust gas purifying catalyst according to claim 1, wherein a relationship between adsorption stabilization energy Ea of noble metal to the first compounds and adsorption stabilization energy Eb of the noble metal to the second compounds, the adsorption stabilization energies Ea and Eb being calculated by simulations using a density functional theory, is Ea<Eb.

6. The exhaust gas purifying catalyst according to claim 5, wherein the relationship between the adsorption stabilization energy Ea and the adsorption stabilization energy Eb is Eb−Ea>10.0 cal/mol.

7. The exhaust gas purifying catalyst according to claim 1, wherein a relationship between a size Da of composite particles including the noble metal particles and the first compounds and an average pore diameter Db of the second compounds is Db<Da.

8. The exhaust gas purifying catalyst according to claim 1, wherein the noble metal particles are made of at least one element selected from the group consisting of Pt, Pd, and Rh, the first compounds are made of an oxide containing Ce, and the second compounds are made of an oxide of at least one element selected from the group consisting of Al and Zr.

9. The exhaust gas purifying catalyst according to claim 4, wherein the average particle diameter of the first compounds is within a range from 5 nm or more to 30 nm or less.

10. The exhaust gas purifying catalyst according to claim 1, wherein an average particle diameter of the noble metal particles is within a range from 2 nm or more to 10 nm or less.

11. The exhaust gas purifying catalyst according to claim 1, wherein 80% or more of the noble metal particles are supported by the first compounds.

12. The exhaust gas purifying catalyst according to claim 8, wherein the oxide containing Ce is $CeO_2$.

13. The exhaust gas purifying catalyst according to claim 8, wherein the oxide containing Ce is a composite oxide of Ce and Zr.

14. The exhaust gas purifying catalyst according to claim 1, wherein the noble metal particles are Pt.

15. The exhaust gas purifying catalyst according to claim 1, further comprising: compounds of at least one element selected from the group consisting of Fe, Co, Ni, and Mn.

16. The exhaust gas purifying catalyst according to claim 1, wherein the second compounds include La.

17. An exhaust gas purifying catalyst, wherein the exhaust gas purifying catalyst is formed by coating slurry containing the exhaust gas purifying catalyst according to claim 1 on a fireproof inorganic support.

18. The exhaust gas purifying catalyst according to claim 1, wherein the second compounds include $Al_2O_3$ derived from boehmite.

19. An exhaust gas purifying catalyst, comprising:
    noble metal particles;
    first compounds supporting the noble metal particles and acting as an anchor agent between the first compounds and the noble metal particles, the first compounds being made of a compound of transition metal and suppressing movement of the noble metal particles; and
    second compounds forming peripheries around simplexes or aggregates of composite particles including the noble metal particles and the first compounds and covering both the noble metal particles and the first compounds,
    wherein the simplexes or aggregates of the first compounds supporting the noble metal particles are included in sections partitioned by the second compounds, and the movement of the simplexes or aggregates is suppressed within the sections.

20. The exhaust gas purifying catalyst according to claim 19, wherein the second compounds are made of an oxide of at least one element selected from the group consisting of Al and Zr.

21. The exhaust gas purifying catalyst according to claim 19, wherein the noble metal particles are made of at least one element selected from the group consisting of Pt, Pd and Rh, the first compounds are made of an oxide containing Ce, and the second compounds are made of an oxide of at least one element selected from the group consisting of Al and Zr.

22. The exhaust gas purifying catalyst according to claim 19, wherein the second compounds include $Al_2O_3$ derived from boehmite.

23. An exhaust gas purifying catalyst, comprising:

noble metal particles;

first compounds supporting the noble metal particles; and second compounds which form mesh-like structures to partition simplexes or aggregates of the first compounds supporting the noble metal particles into sections partitioned by the second compounds and covering both the noble metal particles and the first compounds.

24. The exhaust gas purifying catalyst according to claim 23, wherein an average particle diameter of the first compounds is within a range from 5 nm or more to 30 nm or less.

25. The exhaust gas purifying catalyst according to claim 23, wherein the noble metal particles are made of at least one element selected from the group consisting of Pt, Pd and Rh, the first compounds are made of an oxide containing Ce, and the second compounds are made of an oxide of at least one element selected from the group consisting of Al and Zr.

26. The exhaust gas purifying catalyst according to claim 23, wherein the second compounds are made of an oxide of at least one element selected from the group consisting of Al and Zr.

27. An exhaust gas purifying catalyst, comprising:

noble metal particles;

first compounds supporting the noble metal particles; and second compounds which form mesh-like structures to partition simplexes or aggregates of the first compounds supporting the noble metal particles into sections partitioned by the second compounds and covering both the noble metal particles and the first compounds, wherein the second compounds include $Al_2O_3$ derived from boehmite.

28. An exhaust gas purifying catalyst, comprising:

noble metal particles;

first compounds supporting the noble metal particles; and second compounds formed on the peripheries of the first compounds on which the noble metal particles are supported and covering both of the noble metal particles and the first compounds, wherein a relationship between a size Da of composite particles including the noble metal particles and the first compounds and an average pore diameter Db of the second compounds is Db<Da, and the movement of simplexes or aggregates of the first compounds is suppressed within the sections.

29. The exhaust gas purifying catalyst according to claim 28, wherein a particle diameter of the first compounds included in the section partitioned by the second compounds is 2 μm or less.

30. The exhaust gas purifying catalyst according to claim 28, wherein an average particle diameter of the first compounds included in the section partitioned by the second compounds is 50 nm or less.

31. The exhaust gas purifying catalyst according to claim 28, wherein an average particle diameter of the first compounds is within a range from 5 nm or more to 30 nm or less.

32. The exhaust gas purifying catalyst according to claim 28, wherein an average particle diameter of the noble metal particles is within a range from 2 nm or more to 10 nm or less.

33. The exhaust gas purifying catalyst according to claim 28, wherein the second compounds include $Al_2O_3$ derived from boehmite.

* * * * *